(12) United States Patent
Lee et al.

(10) Patent No.: US 10,634,926 B2
(45) Date of Patent: Apr. 28, 2020

(54) MOBILE TERMINAL INCLUDING DIFFRACTIVE OPTICAL ELEMENT MOVED DIFFERENT DISTANCES TO IRRADIATE DIFFERENT LIGHT PATTERNS ON A SUBJECT

(71) Applicant: LG ELECTRONICS INC., Seoul (KR)

(72) Inventors: Changhwan Lee, Seoul (KR); Yunsup Shin, Seoul (KR); Ayoung Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 175 days.

(21) Appl. No.: 15/980,877

(22) Filed: May 16, 2018

(65) Prior Publication Data
US 2019/0196215 A1 Jun. 27, 2019

(30) Foreign Application Priority Data

Dec. 21, 2017 (KR) .......................... 10-2017-0177456

(51) Int. Cl.
| | | |
|---|---|---|
| *G02B 5/18* | (2006.01) |
| *G02B 27/42* | (2006.01) |
| *H04N 13/271* | (2018.01) |
| *G01B 11/25* | (2006.01) |
| *H04N 13/254* | (2018.01) |

(Continued)

(52) U.S. Cl.
CPC ........ *G02B 27/425* (2013.01); *G01B 11/2513* (2013.01); *G01B 11/2545* (2013.01); *G02B 5/1876* (2013.01); *G02B 26/0808* (2013.01); *G02B 27/4272* (2013.01); *H04N 13/254* (2018.05); *H04N 13/271* (2018.05); *G02B 27/44* (2013.01)

(58) Field of Classification Search
CPC ...... G02B 3/00; G02B 3/0006; G02B 3/0037; G02B 5/18; G02B 2005/1804; G02B 5/1814; G02B 5/1819; G02B 5/1842; G02B 5/1866; G02B 27/0905; G02B 27/0938; G02B 27/0944; G02B 27/10; G02B 27/106; G02B 27/1066; G02B 27/1086; G02B 27/1093; G02B 27/42; G02B 27/4205; G02B 27/4233
USPC ....... 359/362, 363, 432, 558, 566, 569, 571, 359/574, 575, 576, 618, 619, 620, 625, 359/626; 396/111, 113, 119; 250/204, 250/539.29, 559.31
See application file for complete search history.

(56) References Cited

U.S. PATENT DOCUMENTS

| | | | |
|---|---|---|---|
| 9,325,973 B1 | 4/2016 | Hazeghi et al. | |
| 2010/0296536 A1* | 11/2010 | Tao ......................... F21K 9/233 372/36 |
| 2019/0066316 A1* | 2/2019 | Bardagjy ........... G02B 27/0172 |

FOREIGN PATENT DOCUMENTS

| | | |
|---|---|---|
| JP | 2008-256822 A | 10/2008 |
| KR | 10-2017-0066009 A | 6/2017 |
| KR | 10-2017-0134212 A | 12/2017 |

* cited by examiner

*Primary Examiner* — Arnel C Lavarias
(74) *Attorney, Agent, or Firm* — Birch, Stewart, Kolasch & Birch, LLP

(57) ABSTRACT

A mobile terminal having a lighting device including a light emitting element, a diffractive optical element (DOE) to diffract a part of light output from the light emitting element, and a driving unit to move the diffractive optical element so as to vary a distance between the light emitting element and the diffractive optical element.

13 Claims, 10 Drawing Sheets

(51) Int. Cl.
*G02B 26/08* (2006.01)
*G02B 27/44* (2006.01)

(a)          (b)

(a)

(b)

(a)

(b)

MOBILE TERMINAL INCLUDING DIFFRACTIVE OPTICAL ELEMENT MOVED DIFFERENT DISTANCES TO IRRADIATE DIFFERENT LIGHT PATTERNS ON A SUBJECT

CROSS-REFERENCE TO RELATED APPLICATION

Pursuant to 35 U.S.C. § 119(a), this application claims the benefit of an earlier filing date of and the right of priority to Korean Application No. 10-2017-0177456, filed on Dec. 21, 2017, the contents of which are incorporated by reference herein in its entirety.

BACKGROUND OF THE INVENTION

1. Field of the Invention

The present invention relates to a mobile terminal having a lighting device, and more particularly, to a mobile terminal having a lighting device used for capturing a three-dimensional (3D) image or extracting depth information related to the image.

2. Description of the Related Art

Terminals may be divided into mobile/portable terminals and stationary terminals. Also, the mobile terminals may be classified into handheld types and vehicle mount types.

Mobile terminals have become increasingly more functional. Examples of such functions include data and voice communications, capturing images and video via a camera, recording audio, playing music files via a speaker system, and displaying images and video on a display unit. Some mobile terminals include additional functionality which supports electronic game playing, while other terminals are configured as multimedia players. Specifically, in recent time, mobile terminals can receive broadcast and multicast signals to allow viewing of video or television programs As it becomes multifunctional, a mobile terminal can capture still images or moving images, play music or video files, play games, receive broadcast and the like, so as to be implemented as an integrated multimedia player. Recently, as performance of cameras has advanced, various functions using cameras have been developed. For example, development of functions to capture a high quality still image or video or generate a 3D image using depth information (or a depth value) of an image received through a camera have been actively developed.

For those various functions using cameras, a role of a light emitting element is important. Here, the light emitting element serves to emit light to a space corresponding to an image received through a camera. Thus, the necessity to develop a light emitting element for performing various functions using a camera and a method for controlling a light emitting element have emerged.

SUMMARY OF THE INVENTION

Therefore, an aspect of the present invention is to provide a mobile terminal including a lighting device capable of irradiating light, which is used for extracting depth information related to an image captured through a camera, in an optimized manner, and a method for controlling the same.

Another aspect of the present invention is to provide a mobile terminal including a lighting device, capable of irradiating optical spots larger than the number of light sources to a subject in an optimized manner, and a method for controlling the same.

Another aspect of the present invention is to provide a mobile terminal including a lighting device, capable of diffracting light irradiated from a light source to increase the number of light spots per unit area, and a method for controlling the same.

Another aspect of the present invention is to provide a mobile terminal including a lighting device, capable of changing a light pattern formed by light spots, and a method for controlling the same.

A mobile terminal according to one embodiment of the present invention may include a camera, a lighting device, and a controller for controlling the camera and the lighting device.

In an embodiment, the lighting device may include a printed circuit board, a light emitting element provided on the printed circuit board to emit light of a specific pattern, a diffractive optical element (DOE) to diffract a part of light output from the light emitting element, a lens through which light diffracted by the diffractive optical element is incident on a subject, and a driving unit to move the diffractive optical element such that a distance between the light emitting element and the diffractive optical element is varied.

According to an embodiment of the present invention, the present invention can provide a novel lighting device capable of varying a light pattern irradiated on a subject. In addition, the present invention can provide a novel mobile terminal capable of varying resolution for extracting depth information from an image by controlling a light pattern, which is used for extracting the depth information, in various ways when capturing the image.

BRIEF DESCRIPTION OF THE DRAWINGS

The present invention will become more fully understood from the detailed description given hereinbelow and the accompanying drawings, which are given by illustration only, and thus are not limitative of the present invention, and wherein.

DETAILED DESCRIPTION OF THE INVENTION

Description will now be given in detail according to exemplary embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

Although the terms first, second, etc. may be used herein to describe various elements, these elements should not be limited by these terms. These terms are generally only used to distinguish one element from another.

When an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context. Terms such as "include" or "has" are used herein and should be understood that they are intended to indicate an existence of several components, functions or steps, disclosed in the specification, and it is also understood that greater or fewer components, functions, or steps may likewise be utilized.

Mobile terminals presented herein may be implemented using a variety of different types of terminals. Examples of such terminals include cellular phones, smart phones, user equipment, laptop computers, digital broadcast terminals, personal digital assistants (PDAs), portable multimedia players (PMPs), navigators, portable computers (PCs), slate PCs, tablet PCs, ultra books, wearable devices (for example, smart watches, smart glasses, head mounted displays (HMDs)), and the like.

By way of non-limiting example only, further description will be made with reference to particular types of mobile terminals. However, such teachings apply equally to other types of terminals, such as those types noted above. In addition, these teachings may also be applied to stationary terminals such as digital TV, desktop computers, and the like.

Figure 1A:
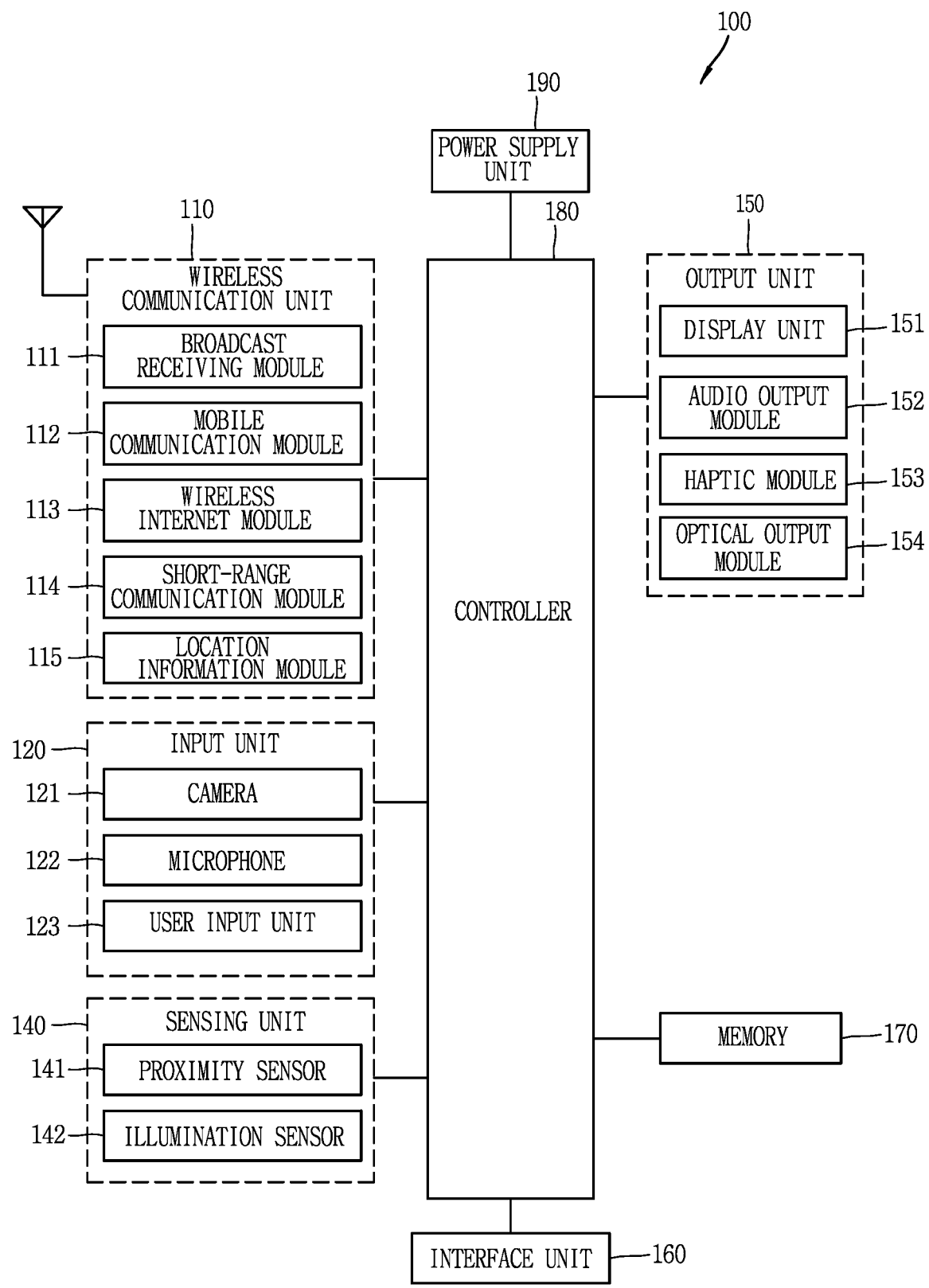
FIG. 1A is a block diagram of a mobile terminal in accordance with one exemplary embodiment of the present invention.
Figure 1B:
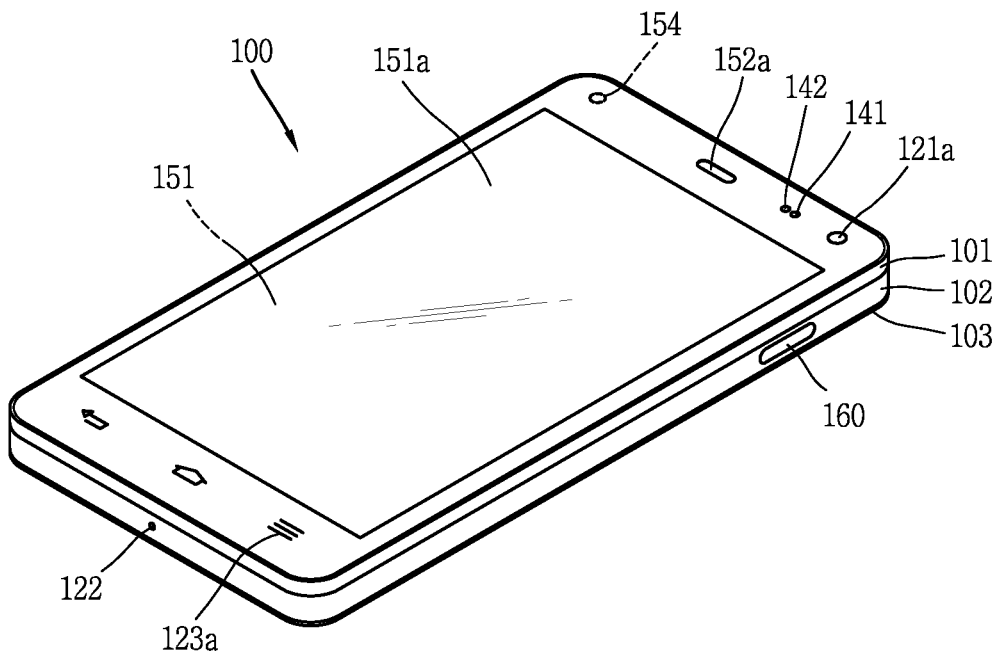
FIGS. 1B and 1C are conceptual views illustrating one example of a mobile terminal according to an embodiment of the present invention, viewed from different directions.
Figure 1C:
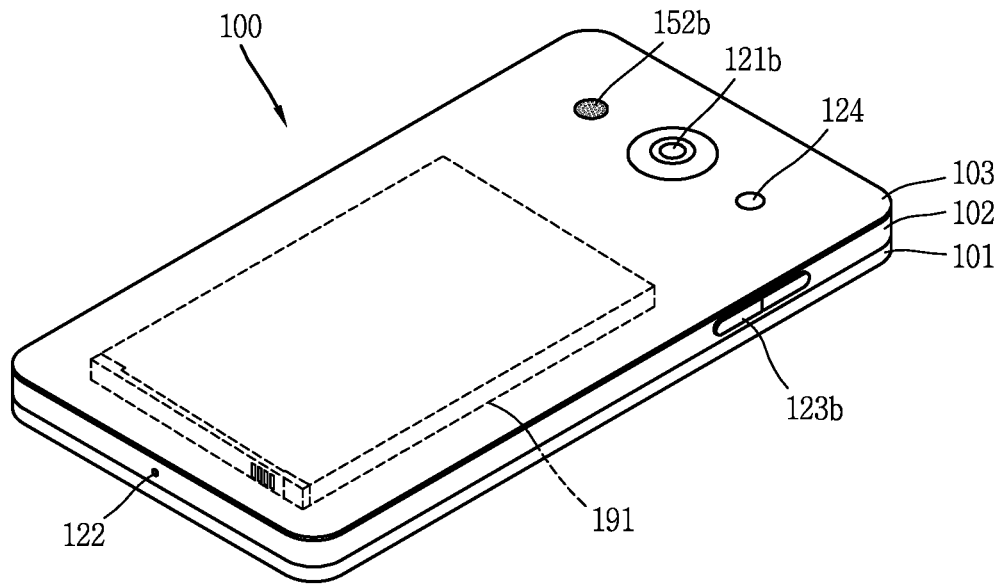

Referring to FIGS. 1A to 1C, FIG. 1A is a block diagram of a mobile terminal in accordance with one exemplary embodiment of the present invention, and FIGS. 1B and 1C are conceptual views illustrating one example of a mobile terminal, viewed from different directions. The mobile terminal 100 may be shown having components such as a wireless communication unit 110, an input unit 120, a sensing unit 140, an output unit 150, an interface unit 160, a memory 170, a controller 180, and a power supply unit 190. Implementing all of the illustrated components is not a requirement, and that greater or fewer components may alternatively be implemented.

In more detail, the wireless communication unit 110 may typically include one or more modules which permit communications such as wireless communications between the mobile terminal 100 and a wireless communication system, communications between the mobile terminal 100 and another mobile terminal, or communications between the mobile terminal 100 and an external server. Further, the wireless communication unit 110 may typically include one or more modules which connect the mobile terminal 100 to one or more networks.

The wireless communication unit 110 may include one or more of a broadcast receiving module 111, a mobile communication module 112, a wireless Internet module 113, a short-range communication module 114, and a location information module 115. The input unit 120 may include a camera 121 or an image input unit for obtaining images or video, a microphone 122, which is one type of audio input device for inputting an audio signal, and a user input unit 123 (for example, a touch key, a mechanical key, and the like) for allowing a user to input information. Data (for example, audio, video, image, and the like) may be obtained by the input unit 120 and may be analyzed and processed according to user commands.

The sensing unit 140 may typically be implemented using one or more sensors configured to sense internal information of the mobile terminal, the surrounding environment of the mobile terminal, user information, and the like. For example, the sensing unit 140 may include at least one of a proximity sensor 141, an illumination sensor 142, a touch sensor, an acceleration sensor, a magnetic sensor, a G-sensor, a gyroscope sensor, a motion sensor, an RGB sensor, an infrared (IR) sensor, a finger scan sensor, a ultrasonic sensor, an optical sensor (for example, camera 121), a microphone 122, a battery gauge, an environment sensor (for example, a barometer, a hygrometer, a thermometer, a radiation detection sensor, a thermal sensor, and a gas sensor, among others), and a chemical sensor (for example, an electronic nose, a health care sensor, a biometric sensor, and the like). The mobile terminal disclosed herein may be configured to utilize information obtained from one or more sensors of the sensing unit 140, and combinations thereof.

The output unit 150 may typically be configured to output various types of information, such as audio, video, tactile output, and the like. The output unit 150 may be shown having at least one of a display unit 151, an audio output module 152, a haptic module 153, and an optical output module 154. The display unit 151 may have an inter-layered structure or an integrated structure with a touch sensor in order to implement a touch screen. The touch screen may function as the user input unit 123 which provides an input interface between the mobile terminal 100 and the user and simultaneously provide an output interface between the mobile terminal 100 and a user.

The interface unit 160 serves as an interface with various types of external devices that are coupled to the mobile terminal 100. The interface unit 160, for example, may include any of wired or wireless ports, external power supply ports, wired or wireless data ports, memory card ports, ports for connecting a device having an identification module, audio input/output (I/O) ports, video I/O ports, earphone ports, and the like. In some cases, the mobile terminal 100 may perform assorted control functions associated with a connected external device, in response to the external device being connected to the interface unit 160.

The memory 170 is typically implemented to store data to support various functions or features of the mobile terminal 100. For instance, the memory 170 may be configured to store application programs executed in the mobile terminal 100, data or instructions for operations of the mobile terminal 100, and the like. Some of these application programs may be downloaded from an external server via wireless communication. Other application programs may be installed within the mobile terminal 100 at time of manufacturing or shipping, which is typically the case for basic functions of the mobile terminal 100 (for example, receiving a call, placing a call, receiving a message, sending a message, and the like). Application programs may be stored in the memory 170, installed in the mobile terminal 100, and executed by the controller 180 to perform an operation (or function) for the mobile terminal 100.

The controller 180 typically functions to control an overall operation of the mobile terminal 100, in addition to the operations associated with the application programs. The controller 180 can provide or process information or functions appropriate for a user by processing signals, data, information and the like, which are input or output by the aforementioned various components, or activating application programs stored in the memory 170.

Also, the controller 180 can control at least some of the components illustrated in FIG. 1A, to execute an application program that have been stored in the memory 170. In addition, the controller 180 can control at least two of those components included in the mobile terminal to activate the application program.

The power supply unit 190 may be configured to receive external power or provide internal power in order to supply appropriate power required for operating elements and components included in the mobile terminal 100. The power supply unit 190 may include a battery, and the battery may be configured to be embedded in the terminal body, or configured to be detachable from the terminal body.

At least part of the components may cooperatively operate to implement an operation, a control or a control method of a mobile terminal according to various embodiments disclosed herein. Also, the operation, the control or the control method of the mobile terminal may be implemented on the mobile terminal by an activation of at least one application program stored in the memory 170.

Hereinafter, description will be given in more detail of the aforementioned components with reference to FIG. 1A, prior to describing various embodiments implemented through the mobile terminal 100. First, regarding the wireless communication unit 110, the broadcast receiving module 111 is typically configured to receive a broadcast signal and/or broadcast associated information from an external broadcast managing entity via a broadcast channel. The broadcast channel may include a satellite channel, a terrestrial channel, or both. In some embodiments, two or more broadcast receiving modules may be utilized to facilitate simultaneous reception of two or more broadcast channels, or to support switching among broadcast channels.

The mobile communication module 112 can transmit and/or receive wireless signals to and from one or more network entities. Typical examples of a network entity include a base station, an external mobile terminal, a server, and the like. Such network entities form part of a mobile communication network, which is constructed according to technical standards or communication methods for mobile communications (for example, Global System for Mobile Communication (GSM), Code Division Multi Access (CDMA), CDMA2000 (Code Division Multi Access 2000), EV-DO (Enhanced Voice-Data Optimized or Enhanced Voice-Data Only), Wideband CDMA (WCDMA), High Speed Downlink Packet access (HSDPA), HSUPA (High Speed Uplink Packet Access), Long Term Evolution (LTE), LTE-A (Long Term Evolution-Advanced), and the like).

The wireless signal may include various types of data depending on a voice call signal, a video call signal, or a text/multimedia message transmission/reception. The wireless Internet module 113 refers to a module for wireless Internet access. This module may be internally or externally coupled to the mobile terminal 100. The wireless Internet module 113 may transmit and/or receive wireless signals via communication networks according to wireless Internet technologies.

Examples of such wireless Internet access include Wireless LAN (WLAN), Wireless Fidelity (Wi-Fi), Wi-Fi Direct, Digital Living Network Alliance (DLNA), Wireless Broadband (WiBro), Worldwide Interoperability for Microwave Access (WiMAX), High Speed Downlink Packet Access (HSDPA), High Speed Uplink Packet Access (HSUPA), Long Term Evolution (LTE), LTE-advanced (LTE-A) and the like. The wireless Internet module 113 may transmit/receive data according to one or more of such wireless Internet technologies, and other Internet technologies as well.

When the wireless Internet access is implemented according to, for example, WiBro, HSDPA, HSUPA, GSM, CDMA, WCDMA, LTE, LTE-A and the like, as part of a mobile communication network, the wireless Internet module 113 performs such wireless Internet access. As such, the Internet module 113 may cooperate with, or function as, the mobile communication module 112.

The short-range communication module 114 is configured to facilitate short-range communications. Suitable technologies for implementing such short-range communications include BLUETOOTH™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like. The short-range communication module 114 in general supports wireless communications between the mobile terminal 100 and a wireless communication system, communications between the mobile terminal 100 and another mobile terminal 100, or communications between the mobile terminal and a network where another mobile terminal 100 (or an external server) is located, via wireless area networks. One example of the wireless area networks is a wireless personal area networks.

Here, another mobile terminal (which may be configured similarly to mobile terminal 100) may be a wearable device, for example, a smart watch, a smart glass or a head mounted display (HMD), which can exchange data with the mobile terminal 100 (or otherwise cooperate with the mobile terminal 100). The short-range communication module 114 may sense or recognize the wearable device, and permit communication between the wearable device and the mobile terminal 100. In addition, when the sensed wearable device is a device which is authenticated to communicate with the mobile terminal 100, the controller 180, for example, may cause transmission of at least part of data processed in the mobile terminal 100 to the wearable device via the short-range communication module 114. Hence, a user of the wearable device may use the data processed in the mobile terminal 100 on the wearable device. For example, when a call is received in the mobile terminal 100, the user may answer the call using the wearable device. Also, when a message is received in the mobile terminal 100, the user can check the received message using the wearable device.

The location information module 115 is generally configured to detect, calculate, derive or otherwise identify a position (or current position) of the mobile terminal. As an example, the location information module 115 includes a Global Position System (GPS) module, a Wi-Fi module, or both. For example, when the mobile terminal uses a GPS module, a position of the mobile terminal may be acquired using a signal sent from a GPS satellite. As another example, when the mobile terminal uses the Wi-Fi module, a position of the mobile terminal can be acquired based on information related to a wireless access point (AP) which transmits or receives a wireless signal to or from the Wi-Fi module. If desired, the location information module 115 may alternatively or additionally function with any of the other modules of the wireless communication unit 110 to obtain data related to the position of the mobile terminal. The location information module 115 is a module used for acquiring the position (or the current position) and may not be limited to a module for directly calculating or acquiring the position of the mobile terminal.

Examples of such inputs include audio, image, video, data, and user input. Image and video input is often obtained using one or more cameras 121. Such cameras 121 may process image frames of still pictures or video obtained by image sensors in a video or image capture mode. The processed image frames can be displayed on the display unit 151 or stored in memory 170. Meanwhile, the cameras 121 may be arranged in a matrix configuration to permit a plurality of images having various angles or focal points to be input to the mobile terminal 100. Also, the cameras 121 may be located in a stereoscopic arrangement to acquire left and right images for implementing a stereoscopic image.

The microphone 122 processes an external audio signal into electric audio (sound) data. The processed audio data can be processed in various manners according to a function being executed in the mobile terminal 100. If desired, the microphone 122 may include assorted noise removing algorithms to remove unwanted noise generated in the course of receiving the external audio signal.

The user input unit 123 is a component that permits input by a user. Such user input may enable the controller 180 to control operation of the mobile terminal 100. The user input unit 123 may include one or more of a mechanical input element (for example, a mechanical key, a button located on a front and/or rear surface or a side surface of the mobile terminal 100, a dome switch, a jog wheel, a jog switch, and the like), or a touch-sensitive input element, among others. As one example, the touch-sensitive input element may be a virtual key, a soft key or a visual key, which is displayed on a touch screen through software processing, or a touch key which is located on the mobile terminal at a location that is other than the touch screen. Further, the virtual key or the visual key may be displayed on the touch screen in various shapes, for example, graphic, text, icon, video, or a combination thereof.

The sensing unit 140 is generally configured to sense one or more of internal information of the mobile terminal, surrounding environment information of the mobile terminal, user information, or the like, and generate a corresponding sensing signal. The controller 180 generally cooperates with the sending unit 140 to control operations of the mobile terminal 100 or execute data processing, a function or an operation associated with an application program installed in the mobile terminal based on the sensing signal. The sensing unit 140 may be implemented using any of a variety of sensors, some of which will now be described in more detail.

The proximity sensor 141 refers to a sensor to sense presence or absence of an object approaching a surface, or an object located near a surface, by using an electromagnetic field, infrared rays, or the like without a mechanical contact. The proximity sensor 141 may be arranged at an inner region of the mobile terminal covered by the touch screen, or near the touch screen.

When the touch screen is implemented as a capacitance type, the proximity sensor 141 can sense proximity of a pointer relative to the touch screen by changes of an electromagnetic field, which is responsive to an approach of an object with conductivity. When the touch screen is implemented as a capacitance type, the proximity sensor 141 can sense proximity of a pointer relative to the touch screen by changes of an electromagnetic field, which is responsive to an approach of an object with conductivity. In this instance, the touch screen (touch sensor) may also be categorized as a proximity sensor.

The term "proximity touch" will often be referred to herein to denote the scenario in which a pointer is positioned to be proximate to the touch screen without contacting the touch screen. The term "contact touch" will often be referred to herein to denote the scenario in which a pointer makes physical contact with the touch screen. For the position corresponding to the proximity touch of the pointer relative to the touch screen, such position will correspond to a position where the pointer is perpendicular to the touch screen. The proximity sensor 141 may sense proximity touch, and proximity touch patterns (for example, distance, direction, speed, time, position, moving status, and the like). In general, controller 180 processes data corresponding to proximity touches and proximity touch patterns sensed by the proximity sensor 141, and cause output of visual information on the touch screen. In addition, the controller 180 can control the mobile terminal 100 to execute different operations or process different data (or information) according to whether a touch with respect to a point on the touch screen is either a proximity touch or a contact touch.

A touch sensor senses a touch (or a touch input) applied to the touch screen (or the display unit 151) using any of a variety of touch methods. Examples of such touch methods include a resistive type, a capacitive type, an infrared type, and a magnetic field type, among others.

As one example, the touch sensor may be configured to convert changes of pressure applied to a specific part of the display unit 151, or convert capacitance occurring at a specific part of the display unit 151, into electric input signals. The touch sensor may also be configured to sense not only a touched position and a touched area, but also touch pressure and/or touch capacitance. A touch object is generally used to apply a touch input to the touch sensor. Examples of typical touch objects include a finger, a touch pen, a stylus pen, a pointer, or the like.

When a touch input is sensed by a touch sensor, corresponding signals may be transmitted to a touch controller. The touch controller may process the received signals, and then transmit corresponding data to the controller 180. Accordingly, the controller 180 can sense which region of the display unit 151 has been touched. Here, the touch controller may be a component separate from the controller 180, the controller 180, and combinations thereof.

In addition, the controller 180 can execute the same or different controls according to a type of touch object that touches the touch screen or a touch key provided in addition to the touch screen. Whether to execute the same or different control according to the object which provides a touch input may be decided based on a current operating state of the mobile terminal 100 or a currently executed application program, for example.

The touch sensor and the proximity sensor may be implemented individually, or in combination, to sense various types of touches. Such touches include a short (or tap) touch, a long touch, a multi-touch, a drag touch, a flick touch, a pinch-in touch, a pinch-out touch, a swipe touch, a hovering touch, and the like.

If desired, an ultrasonic sensor may be implemented to recognize location information relating to a touch object using ultrasonic waves. The controller 180, for example, may calculate a position of a wave generation source based on information sensed by an illumination sensor and a plurality of ultrasonic sensors. Since light is much faster than ultrasonic waves, the time for which the light reaches the optical sensor is much shorter than the time for which the ultrasonic wave reaches the ultrasonic sensor. The position of the wave generation source may be calculated using this fact. For instance, the position of the wave generation source may be calculated using the time difference from the time that the ultrasonic wave reaches the sensor based on the light as a reference signal.

The camera 121, which has been depicted as a component of the input unit 120, typically includes at least one a camera sensor (CCD, CMOS etc.), a photo sensor (or image sensors), and a laser sensor. Implementing the camera 121 with a laser sensor may allow detection of a touch of a physical object with respect to a 3D stereoscopic image. The photo sensor may be laminated on, or overlapped with, the display device. The photo sensor may be configured to scan movement of the physical object in proximity to the touch screen. In more detail, the photo sensor may include photo diodes and transistors (TRs) at rows and columns to scan content received at the photo sensor using an electrical signal which changes according to the quantity of applied light. Namely, the photo sensor may calculate the coordinates of the physical object according to variation of light to thus obtain location information of the physical object.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

Also, the display unit 151 may be implemented as a stereoscopic display unit for displaying stereoscopic images. A typical stereoscopic display unit may employ a stereoscopic display scheme such as a stereoscopic scheme (a glass scheme), an auto-stereoscopic scheme (glassless scheme), a projection scheme (holographic scheme), or the like.

The audio output module 152 may receive audio data from the wireless communication unit 110 or output audio data stored in the memory 170 during modes such as a signal reception mode, a call mode, a record mode, a voice recognition mode, a broadcast reception mode, and the like. The audio output module 152 can provide audible output related to a particular function (e.g., a call signal reception sound, a message reception sound, etc.) performed by the mobile terminal 100. The audio output module 152 may also be implemented as a receiver, a speaker, a buzzer, or the like.

A haptic module 153 can be configured to generate various tactile effects that a user feels, perceives, or otherwise experiences. A typical example of a tactile effect generated by the haptic module 153 is vibration. The strength, pattern and the like of the vibration generated by the haptic module 153 can be controlled by user selection or setting by the controller. For example, the haptic module 153 may output different vibrations in a combining manner or a sequential manner.

Besides vibration, the haptic module 153 can generate various other tactile effects, including an effect by stimulation such as a pin arrangement vertically moving to contact skin, a spray force or suction force of air through a jet orifice or a suction opening, a touch to the skin, a contact of an electrode, electrostatic force, an effect by reproducing the sense of cold and warmth using an element that can absorb or generate heat, and the like.

The haptic module 153 can also be implemented to allow the user to feel a tactile effect through a muscle sensation such as the user's fingers or arm, as well as transferring the tactile effect through direct contact. Two or more haptic modules 153 may be provided according to the particular configuration of the mobile terminal 100.

An optical output module 154 can output a signal for indicating an event generation using light of a light source. Examples of events generated in the mobile terminal 100 may include message reception, call signal reception, a missed call, an alarm, a schedule notice, an email reception, information reception through an application, and the like.

A signal output by the optical output module 154 may be implemented so the mobile terminal emits monochromatic light or light with a plurality of colors. The signal output may be terminated as the mobile terminal senses that a user has checked the generated event, for example.

The interface unit 160 serves as an interface for external devices to be connected with the mobile terminal 100. For example, the interface unit 160 can receive data transmitted from an external device, receive power to transfer to elements and components within the mobile terminal 100, or transmit internal data of the mobile terminal 100 to such external device. The interface unit 160 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating authority of using the mobile terminal 100 and may include a user identity module (UIM), a subscriber identity module (SIM), a universal subscriber identity module (USIM), and the like. In addition, the device having the identification module (also referred to herein as an "identifying device") may take the form of a smart card. Accordingly, the identifying device can be connected with the terminal 100 via the interface unit 160.

When the mobile terminal 100 is connected with an external cradle, the interface unit 160 can serve as a passage to allow power from the cradle to be supplied to the mobile terminal 100 or may serve as a passage to allow various command signals input by the user from the cradle to be transferred to the mobile terminal therethrough. Various command signals or power input from the cradle may operate as signals for recognizing that the mobile terminal is properly mounted on the cradle.

The memory 170 can store programs to support operations of the controller 180 and store input/output data (for example, phonebook, messages, still images, videos, etc.). The memory 170 may store data related to various patterns of vibrations and audio which are output in response to touch inputs on the touch screen.

The memory 170 may include one or more types of storage mediums including a flash memory type, a hard disk type, a solid state disk (SSD) type, a silicon disk drive (SDD) type, a multimedia card micro type, a card-type memory (e.g., SD or DX memory, etc.), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, an optical disk, and the like. The mobile terminal 100 may also be operated in relation to a network storage device that performs the storage function of the memory 170 over a network, such as the Internet.

The controller 180 can typically control operations relating to application programs and the general operations of the mobile terminal 100. For example, the controller 180 can set or release a lock state for restricting a user from inputting a control command with respect to applications when a status of the mobile terminal meets a preset condition.

The controller 180 can also perform the controlling and processing associated with voice calls, data communications, video calls, and the like, or perform pattern recognition processing to recognize a handwriting input or a picture drawing input performed on the touch screen as characters or images, respectively. In addition, the controller 180 can control one or a combination of those components in order to implement various exemplary embodiments disclosed herein.

The power supply unit 190 receives external power or provides internal power and supply the appropriate power required for operating respective elements and components included in the wearable device 100 under the control of the controller 180. The power supply unit 190 may include a battery, which is typically rechargeable or be detachably coupled to the terminal body for charging. The power supply unit 190 may include a connection port. The connection port may be configured as one example of the interface unit 160 to which an external charger for supplying power to recharge the battery is electrically connected.

As another example, the power supply unit 190 may be configured to recharge the battery in a wireless manner without use of the connection port. In this example, the power supply unit 190 can receive power, transferred from an external wireless power transmitter, using at least one of an inductive coupling method which is based on magnetic induction or a magnetic resonance coupling method which is based on electromagnetic resonance. Various embodiments described herein may be implemented in a computer-readable medium, a machine-readable medium, or similar medium using, for example, software, hardware, or any combination thereof.

Referring to FIGS. 1B and 1C, the disclosed mobile terminal 100 includes a bar-like terminal body. However, the electronic device 100 may alternatively be implemented in any of a variety of different configurations. Examples of such configurations include watch type, clip-type, glasses-type, or a folder-type, flip-type, slide-type, swing-type, and swivel-type in which two and more bodies are combined with each other in a relatively movable manner, and combinations thereof. Discussion herein will often relate to a particular type of mobile terminal. However, such teachings with regard to a particular type of mobile terminal will generally apply to other types of mobile terminals as well.

The mobile terminal 100 will generally include a case (for example, frame, housing, cover, and the like) forming the appearance of the terminal. In this embodiment, the case is formed using a front case 101 and a rear case 102. Various electronic components are interposed into a space formed between the front case 101 and the rear case 102. At least one middle case may be additionally positioned between the front case 101 and the rear case 102.

The display unit 151 is shown located on the front side of the terminal body to output information. As illustrated, a window 151a of the display unit 151 may be mounted to the front case 101 to form the front surface of the terminal body together with the front case 101. In some embodiments, electronic components may also be mounted to the rear case 102. Examples of such electronic components include a detachable battery 191, an identification module, a memory card, and the like. In this instance, a rear cover 103 is shown covering the electronic components, and this cover may be detachably coupled to the rear case 102. Therefore, when the rear cover 103 is detached from the rear case 102, the electronic components mounted on the rear case 102 are exposed to the outside.

As illustrated, when the rear cover 103 is coupled to the rear case 102, a side surface of the rear case 102 may partially be exposed. In some cases, upon the coupling, the rear case 102 may also be completely shielded by the rear cover 103. Meanwhile, the rear cover 103 may include an opening for externally exposing a camera 121b or an audio output module 152b.

The cases 101, 102, 103 may be formed by injection-molding synthetic resin or may be formed of a metal, for example, stainless steel (STS), aluminum (Al), titanium (Ti), or the like. As an alternative to the example in which the plurality of cases form an inner space for accommodating components, the mobile terminal 100 may be configured such that one case forms the inner space. In this instance, a mobile terminal 100 having a uni-body is formed so synthetic resin or metal extends from a side surface to a rear surface.

In addition, the mobile terminal 100 may include a waterproofing unit for preventing introduction of water into the terminal body. For example, the waterproofing unit may include a waterproofing member which is located between the window 151a and the front case 101, between the front case 101 and the rear case 102, or between the rear case 102 and the rear cover 103, to hermetically seal an inner space when those cases are coupled.

The mobile terminal 100 may include a display unit 151, first and second audio output module 152a and 152b, a proximity sensor 141, an illumination sensor 142, an optical output module 154, first and second cameras 121a and 121b, first and second manipulation units 123a and 123b, a microphone 122, an interface unit 160, and the like.

Hereinafter, as illustrated in FIGS. 1B and 1C, description will be given of the exemplary mobile terminal 100 in which the front surface of the terminal body is shown having the display unit 151, the first audio output module 152a, the proximity sensor 141, the illumination sensor 142, the optical output module 154, the first camera 121a, and the first manipulation unit 123a, the side surface of the terminal body is shown having the second manipulation unit 123b, the microphone 122, and the interface unit 160, and the rear surface of the terminal body is shown having the second audio output module 152b and the second camera 121b.

However, those components may not be limited to the arrangement. Some components may be omitted or rearranged or located on different surfaces. For example, the first manipulation unit 123a may be located on another surface of the terminal body, and the second audio output module 152b may be located on the side surface of the terminal body other than the rear surface of the terminal body.

The display unit 151 is generally configured to output information processed in the mobile terminal 100. For example, the display unit 151 may display execution screen information of an application program executing at the mobile terminal 100 or user interface (UI) and graphic user interface (GUI) information in response to the execution screen information.

The display module 151 may include at least one of a liquid crystal display (LCD), a thin film transistor-LCD (TFT LCD), an organic light-emitting diode (OLED), a flexible display, a three-dimensional (3D) display and an e-ink display. The display unit 151 may be implemented using two display devices, according to the configuration type thereof. For instance, a plurality of the display units 151 may be arranged on one side, either spaced apart from each other, or these devices may be integrated, or these devices may be arranged on different surfaces.

The display unit 151 may include a touch sensor that senses a touch with respect to the display unit 151 so as to receive a control command in a touch manner. Accordingly, when a touch is applied to the display unit 151, the touch sensor may sense the touch, and a controller 180 may generate a control command corresponding to the touch. Contents input in the touch manner may be characters, numbers, instructions in various modes, or a menu item that can be specified.

Further, the touch sensor may be configured in a form of a film having a touch pattern and disposed between a window 151a and a display (not illustrated) on a rear surface of the window or may be a metal wire directly patterned on the rear surface of the window. Alternatively, the touch sensor may be formed integrally with the display. For example, the touch sensor may be disposed on a substrate of the display or may be provided inside the display.

In this way, the display unit 151 may form a touch screen together with the touch sensor, and in this instance, the touch screen may function as the user input unit (123, see FIG. 1A). In some cases, the touch screen may replace at least some of functions of a first manipulation unit 123a.

The first audio output module 152a may be implemented as a receiver for transmitting a call sound to a user's ear and the second audio output module 152b may be implemented as a loud speaker for outputting various alarm sounds or multimedia playback sounds.

The window 151a of the display unit 151 may include a sound hole for emitting sounds generated from the first audio output module 152a. However, the present invention is not limited thereto, and the sounds may be released along an assembly gap between the structural bodies (for example, a gap between the window 151a and the front case 101). In this instance, a hole independently formed to output audio sounds may not be seen or may otherwise be hidden in terms of appearance, thereby further simplifying the appearance of the mobile terminal 100.

The optical output module 154 may be configured to output light for indicating an event generation. Examples of such events may include a message reception, a call signal reception, a missed call, an alarm, a schedule alarm, an email reception, information reception through an application, and the like. When a user has checked a generated event, the controller 180 can control the optical output module 154 to stop the light output.

The first camera 121a may process image frames such as still or moving images obtained by the image sensor in a capture mode or a video call mode. The processed image frames can then be displayed on the display unit 151 or stored in the memory 170.

The first and second manipulation units 123a and 123b are examples of the user input unit 123, which may be manipulated by a user to provide input to the mobile terminal 100. The first and second manipulation units 123a and 123b may also be commonly referred to as a manipulating portion. The first and second manipulation units 123a and 123b may employ any method if it is a tactile manner allowing the user to perform manipulation with a tactile feeling such as touch, push, scroll or the like. The first and second manipulation units 123a and 123b may also be manipulated through a proximity touch, a hovering touch, and the like, without a user's tactile feeling.

The drawings are illustrated on the basis that the first manipulation unit 123a is a touch key, but the present disclosure are not limited to this. For example, the first manipulation unit 123a may be configured with a mechanical key, or a combination of a touch key and a push key.

The content received by the first and second manipulation units 123a and 123b may be set in various ways. For example, the first manipulation unit 123a may be used by the user to input a command such as menu, home key, cancel, search, or the like, and the second manipulation unit 123b may be used by the user to input a command, such as controlling a volume level being output from the first or second audio output module 152a or 152b, switching into a touch recognition mode of the display unit 151, or the like.

Further, as another example of the user input unit 123, a rear input unit may be disposed on the rear surface of the terminal body. The rear input unit may be manipulated by a user to input a command for controlling an operation of the mobile terminal 100. The content input may be set in various ways. For example, the rear input unit may be used by the user to input a command, such as power on/off, start, end, scroll or the like, controlling a volume level being output from the first or second audio output module 152a or 152b, switching into a touch recognition mode of the display unit 151, or the like. The rear input unit may be implemented into a form allowing a touch input, a push input or a combination thereof.

The rear input unit may be disposed to overlap the display unit 151 of the front surface in a thickness direction of the terminal body. As one example, the rear input unit may be disposed on an upper end portion of the rear surface of the terminal body such that a user can easily manipulate it using a forefinger when the user grabs the terminal body with one hand. However, the present disclosure may not be limited to this, and the position of the rear input unit may be changeable.

When the rear input unit is disposed on the rear surface of the terminal body, a new user interface may be implemented using the rear input unit. Also, the aforementioned touch screen or the rear input unit may substitute for at least part of functions of the first manipulation unit 123a located on the front surface of the terminal body. Accordingly, when the first manipulation unit 123a is not disposed on the front surface of the terminal body, the display unit 151 may be implemented to have a larger screen.

Further, the mobile terminal 100 may include a finger scan sensor which scans a user's fingerprint. The controller may use fingerprint information sensed by the finger scan sensor as an authentication means. The finger scan sensor may be installed in the display unit 151 or the user input unit 123.

The microphone 122 may be configured to receive the user's voice, other sounds, and the like. The microphone 122 may be provided at a plurality of places and configured to receive stereo sounds.

The interface unit 160 may serve as a path allowing the mobile terminal 100 to interface with external devices. For example, the interface unit 160 may be at least one of a connection terminal for connecting to another device (for example, an earphone, an external speaker, or the like), a port for near field communication (for example, an Infrared DaAssociation (IrDA) port, a Bluetooth port, a wireless LAN port, and the like), or a power supply terminal for supplying power to the mobile terminal 100. The interface unit 160 may be implemented in the form of a socket for accommodating an external card, such as Subscriber Identification Module (SIM), User Identity Module (UIM), or a memory card for information storage.

The second camera 121b may be further mounted to the rear surface of the terminal body. The second camera 121b may have an image capturing direction, which is substantially opposite to the direction of the first camera unit 121a.

The second camera 121b may include a plurality of lenses arranged along at least one line. The plurality of lenses may be arranged in a matrix form. The cameras may be referred to as an 'array camera.' When the second camera 121b is implemented as the array camera, images may be captured in various manners using the plurality of lenses and images with better qualities may be obtained.

The flash 124 may be disposed adjacent to the second camera 121b. When an image of a subject is captured with the camera 121b, the flash 124 may illuminate the subject. The second audio output module 152b may further be disposed on the terminal body. The second audio output module 152b may implement stereophonic sound functions in conjunction with the first audio output module 152a and may be also used for implementing a speaker phone mode for call communication.

At least one antenna for wireless communication may be disposed on the terminal body. The antenna may be embedded in the terminal body or formed in the case. For example, an antenna which configures a part of the broadcast receiving module 111 (see FIG. 1A) may be retractable into the terminal body. Alternatively, an antenna may be formed in a form of film to be attached onto an inner surface of the rear cover 103 or a case including a conductive material may serve as an antenna.

The terminal body is provided with a power supply unit 190 (see FIG. 1A) for supplying power to the mobile terminal 100. The power supply unit 190 may include a batter 191 which is mounted in the terminal body or detachably coupled to an outside of the terminal body.

The battery 191 may receive power via a power cable connected to the interface unit 160. Also, the battery 191 may be (re)chargeable in a wireless manner using a wireless charger. The wireless charging may be implemented by magnetic induction or electromagnetic resonance.

Further, the drawing illustrates that the rear cover 103 is coupled to the rear case 102 for shielding the battery 191, so as to prevent separation of the battery 191 and protect the battery 191 from an external impact or foreign materials. When the battery 191 is detachable from the terminal body, the rear case 103 may be detachably coupled to the rear case 102.

An accessory for protecting an appearance or assisting or extending the functions of the mobile terminal 100 may further be provided on the mobile terminal 100. As one example of the accessory, a cover or pouch for covering or accommodating at least one surface of the mobile terminal 100 may be provided. The cover or pouch may cooperate with the display unit 151 to extend the function of the electronic device 100. Another example of the accessory may be a touch pen for assisting or extending a touch input onto a touch screen.

In addition, the mobile terminal related to the present disclosure can extract (detect, determine, sense) depth information from an image captured through a camera, using the camera and a lighting device. Also, the mobile terminal related to the present disclosure can capture (or generate) a 3D image using the camera and the lighting device. For example, the mobile terminal related to the present disclosure may convert (generate) a 2D image captured through the camera into a 3D image based on the extracted depth information. In another example, the mobile terminal related to the present disclosure may determine a distance to a subject based on light irradiated from the lighting device and capture (or generate) a 3D image through the camera based on the distance to the subject.

Hereinafter, a method for extracting depth information from an image captured using the camera and the lighting device will be described in detail with reference to the accompanying drawings. In addition, extracting depth information from an image captured through the camera will be described, but related contents may also be inferred and applied to capturing (or generating a 3D image in the same/like manner.

The mobile terminal 100 related to the present disclosure can extract depth information received (or captured) through the camera 121 The image received through the camera may be referred to as a preview image. In more detail, the preview image may refer to an image received through the camera in real time. The preview image may be changed as the mobile terminal having the camera 121 is moved by an external force or as a subject moves.

An image captured through the camera may refer to an image obtained by capturing a preview image, for example. For example, the image may be captured as an image capture button output on the display unit of the mobile terminal is touched, as a user's gesture associated to capture a preview image is sensed through the preview image, or as a physical button provided in the mobile terminal is pressed. An image described in this disclosure may refer to at least one of a preview image and a captured image.

Depth information described in this disclosure may be a depth value. The depth information may refer to a distance (or a distance value) between a subject corresponding pixels included in the image and the mobile terminal (specifically, the camera). For example, when a subject corresponding to a specific pixel of the image and the mobile terminal is n, depth information of the specific pixel can be a specific value corresponding to n. The specific value corresponding to n can be n or a value converted by a preset algorithm.

Also, the depth information can be a value corresponding to a z axis perpendicular to an x axis and a y axis when coordinates of the image are set to the x axis and the y axis perpendicular to the x axis. An absolute value of the depth information can be increased as a distance between the subject and the mobile terminal is increased.

The depth information can be utilized in various fields. For example, the depth information can be used for capturing/generating a 3D stereoscopic image (stereoscopy), used for generating 3D printing data used in a 3D printer, or used for detecting movement of an object (or subject) around the mobile terminal.

The mobile terminal related to the present disclosure can extract depth information of an image received (or captured) through the camera in various manners. For example, the controller 180 can extract depth information through a stereo vision scheme of extracting depth information using at least two cameras, a structure light scheme of extracting depth information using light emitting elements disposed to form a preset pattern, a time of flight (ToF) scheme of extracting depth information based on time during which light emitted from a light emitting element is reflected to be returned, or any combination thereof.

Hereinafter, extracting depth information using the structure light scheme, among the aforementioned schemes, will be largely described. The structure light scheme emits light to a subject by controlling a plurality of light emitting elements disposed to have a preset pattern, senses light reflected from the subject, and subsequently extracts depth information based on the sensed light (or a pattern of sensed light).

In more detail, the structure light scheme extracts depth information by irradiating light to a subject from a plurality of light emitting elements disposed to have a preset pattern and calculating a shift amount (or a shift amount of a reflected light pattern) of reflected light returned with respect to the preset pattern.

For example, the controller 180 of the mobile terminal related to the present disclosure controls the plurality of light emitting elements disposed to have a preset pattern to emit light to the subject. Thereafter, the controller 180 of the mobile terminal can sense light reflected and returned from the subject through the sensing unit 140 of FIG. 1A.

Here, the controller 180 can extract depth information of an image received through the camera 121 based on the sensing result. For example, the controller 180 can extract depth information of the image received through the camera 121 by comparing the pattern formed by light which is reflected and returned with the preset pattern.

In more detail, the controller 180 can extract depth information of the image received through the camera 121 by comparing a preset pattern in which a plurality of light emitting elements emit light to the subject (or a preset pattern in which the plurality of light emitting elements are disposed) and a pattern formed by reflected and returned light (or optical spot) and calculating a shift amount regarding each of the reflected and returned light (or optical spot) with respect to the preset pattern (or a changed form, a changed distance, a changed direction, and the like) or a shift amount regarding a pattern of returned light.

In another example, in the structure light scheme, the controller 180 can extract depth information of the image received through the camera 121 by comparing time during which light emitted from the plurality of light emitting elements is reflected to be returned and strength of reflected and returned light. Thus, the plurality of light emitting elements can be formed to emit light to a space corresponding to the image received through the camera 121.

The preset pattern can be determined (or set) by the user or be predetermined when a product of the mobile terminal was manufactured. Also, the preset pattern can be changed according to a user request or by controlling of the controller. Further, the plurality of light emitting elements can emit infrared light. The light emitting elements may be laser diodes changing an electrical signal into an optical signal. For example, the light emitting elements may be a vertical cavity surface emitting laser (VCSEL).

In the present disclosure, depth information of the image can be extracted through one camera (infrared camera or a 3D camera) using the structure light scheme, and even when the subject has a single color, depth information can be extracted. Also, accuracy regarding depth information can be enhanced by combining the structure light scheme and a stereo vision scheme using at least two cameras or combining the structure light scheme and the ToF scheme.

The ToF scheme may be a scheme of measuring depth information of an image by calculating a time during which light directly irradiated on an object is returned as reflected light. Further, the stereo vision scheme may be a scheme of symmetrically disposing a plurality of cameras (e.g., two cameras) and extracting depth information of an image received through the camera using disparity (or a difference in distance, space) between an image received through a first camera (e.g., a left camera) among the plurality of cameras and an image received through a second camera (e.g., a right camera) among the plurality of cameras. The mobile terminal related to the present disclosure can use a combination of the stereo vision scheme and the structure light scheme.

Figure 2:
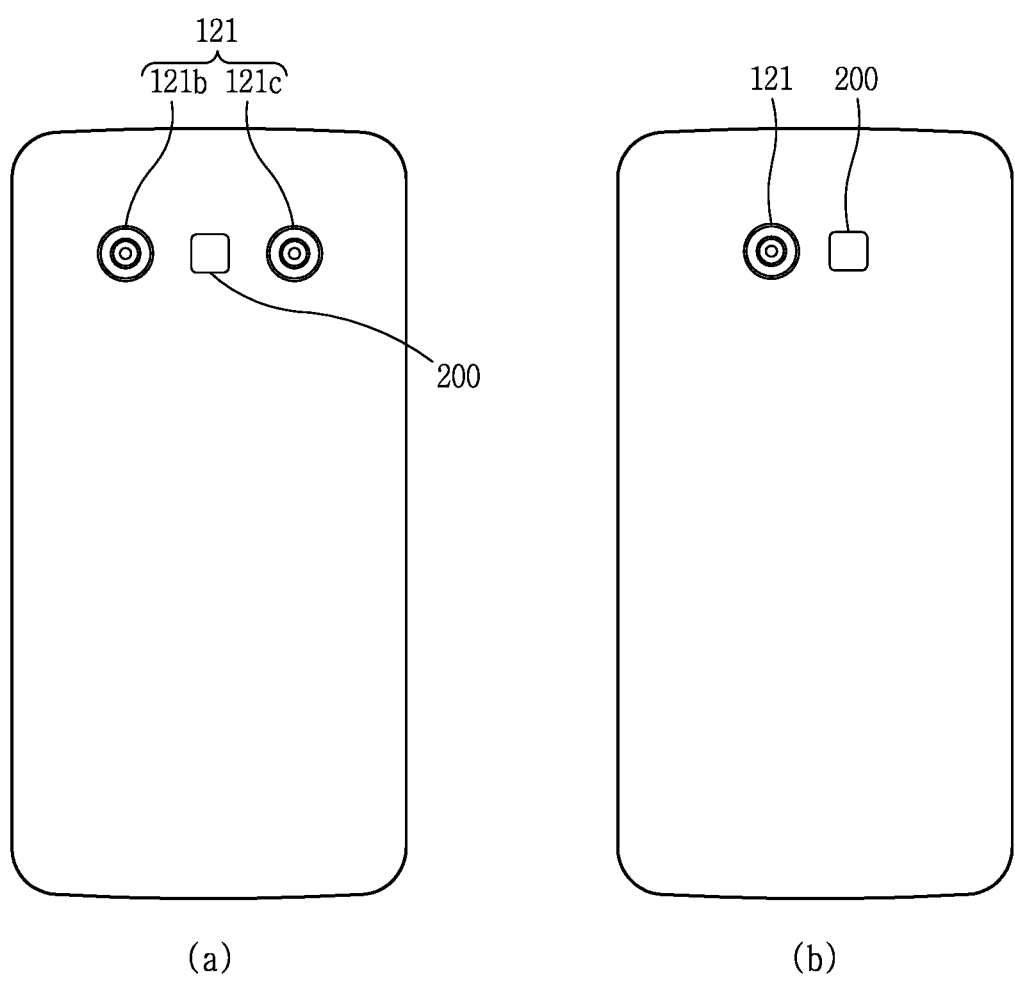
FIG. 2 is a conceptual view illustrating a camera and a lighting device provided in a mobile terminal related to the present disclosure.

Next, FIG. 2 is a conceptual view illustrating a camera and a lighting device provided in a mobile terminal related to an embodiment of the present disclosure. As illustrated in (a) of FIG. 2, the mobile terminal may include a plurality of cameras 121b and 121c on one surface thereof. Here, one surface of the mobile terminal 100 may be at least one of a rear surface, a front surface, and a side surface of the main body of the mobile terminal.

FIG. 2(a) illustrates the plurality of cameras 121b and 121c are provided on the rear surface of the main body of the mobile terminal. Further, a lighting device 200 of the present disclosure can be provided on one surface on which the plurality of cameras 121b and 121c are provided.

The lighting device 200 includes a plurality of light emitting elements, and as described above, the lighting device 200 can irradiate light having a preset pattern to extract depth information of an image through the structure light scheme. Here, the plurality of light emitting elements (or a plurality of light sources) may be, for example VCSEL.

As illustrated in (a) of FIG. 2, the mobile terminal can extract depth information of an image received through the cameras by combining the stereo vision scheme and the structure light scheme using the plurality of cameras 121b and 121c and the lighting device 200 capable of irradiating light of a preset pattern.

However, without being limited thereto, although the plurality of cameras 121b and 121c are provided on one surface of the main body of the mobile terminal, the mobile terminal 100 can extract depth information of an image received through the cameras using any one of the stereo vision scheme, the structure light scheme, and the ToF scheme or by combining at least two schemes.

However, without being limited thereto, as illustrated in (b) of FIG. 2, the mobile terminal 100 can extract depth information of an image received through the camera using one camera 121 and the lighting device 200, using only the structure light scheme, using only the ToF scheme, or using a combination of the structure light scheme and the ToF scheme.

In addition, the lighting device 200 can irradiate light to form (or have) a predetermined pattern as described above in the structure light scheme. The lighting device 200 may include a plurality of light emitting elements. Here, the light emitting elements may be the aforementioned VCSEL.

The plurality of light emitting elements can be formed to have a preset pattern or only some of the light emitting elements can be turned on to irradiate light in a preset pattern. The plurality of light emitting elements (or a die including the plurality of light emitting elements) can be referred to as a VCSEL array, for example.

In addition, the controller 180 can individually control each of the plurality of light emitting elements (the plurality of light sources) included in the lighting device 200. In more detail, the controller 180 can individually turn on or off the plurality of light emitting elements provided in the lighting device 200. Also, the controller 180 can individually control an emission intensity of the plurality of light emitting elements provided in the lighting device 200. Further, the controller 180 can individually control (determine) an emission timing of the plurality of light emitting elements provided in the lighting device 200.

The lighting device 200 can also be individually turned on or off, varied in emission intensity, or changed in an emission timing under the control of the controller 180. Accordingly, a pattern (i.e., a preset pattern) of light irradiated from the lighting device 200 can be varied.

Thus, in the lighting device 200 included in the mobile terminal of the present disclosure, a pattern (or intensity of light, a timing of light) of irradiated light can be varied by individually controlling the plurality of light emitting elements (the plurality of VCSELs), and the lighting device 200 may be referred to as active lighting.

In addition, the lighting device 200 can irradiate light (or optical spot) of a preset pattern such that the light can be used for extracting depth information of an image. Here, the optical spot can refer to a region (or point) of a subject to which light is irradiated or a region (or a point) of the mobile terminal (or the lighting device 200, the camera, or the sensing unit) to which light reflected from a subject is irradiated. A pattern, an arrangement, a position, and the like formed by a plurality of light (or a plurality of light spots) irradiated on a subject can be referred to as a pattern in this specification.

Here, in the present disclosure, since the plurality of light emitting elements included in the lighting device 200 are laser diodes (e.g., VCSELs), and thus, when the plurality of light emitting elements emit light, light (laser) is irradiated on a narrow region (or point) of a subject. Accordingly, optical spots may be formed (irradiated) on the subject. Also, in the present disclosure, based on light (laser) reflected from the subject to the mobile terminal, an optical spot irradiated on the subject can be detected.

In addition, the lighting device 200 may include a diffractive optical element (DOE). The DOE can be formed to diffract light (laser) output from the light emitting elements. The DOE can diffract light output from the light emitting element into a plurality of light beams. In this disclosure, diffracting light (laser) can be understood as splitting light, duplicating light, refracting a portion of light, and the like. When one light output from the light emitting element is diffracted (or split) into a plurality of light beams by the DOE, the sum of intensity of the plurality of light beams can be equal to intensity of the one light.

In other words, an intensity of each of the plurality of light beams (i.e., any one of the plurality of light beams diffracted by the DOE) can be weaker than an intensity of the one light beam before entering the DOE. In addition, the lighting device of the present disclosure can output a larger number of light beams (optical spots) than the number of the plurality of light emitting elements using the DOE.

For example, when the number of the plurality of light emitting elements is n and the number of light beams (optical spots) output when one light beam passes through the DOE is m, the lighting device 200 of the present disclosure can output n*m number of light beams (optical spots) (or irradiate the n*m number of light beams to a subject).

In the present disclosure, the lighting device 200 may have a plurality of light emitting elements and a DOE, and the DOE can diffract light output from the plurality of light emitting elements such that a predetermined pattern is formed with respect to each of the plurality of light emitting elements. That is, the lighting device 200 may include the DOE for diffracting light such that each of the light sources has the predetermined pattern. In other words, the DOE included in the lighting device 200 can diffract light such that one light beam output from one light emitting element forms the predetermined pattern. Accordingly, a plurality of light beams output from the plurality of light emitting elements can be diffracted to form the predetermined pattern and pass through the DOE.

In contrast, a related art lighting device (or a related art DOE) is formed to diffract light output from a plurality of light emitting elements such that a plurality of patterns is formed by the plurality of light emitting elements. The related art lighting technique will be described in detail with reference to FIG. 3.

Figure 3:
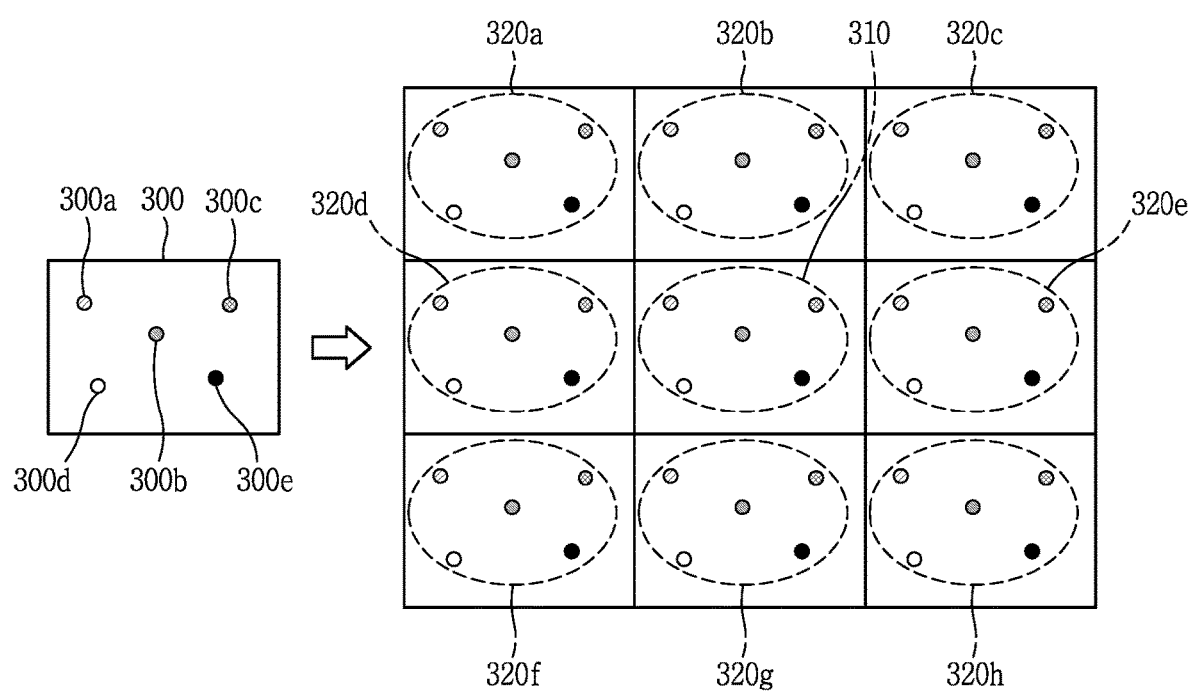
FIG. 3 is a conceptual view illustrating the related art lighting technique.

In particular, FIG. 3 is a conceptual view illustrating the related art lighting technique. In FIG. 3, for the purposes of description, an embodiment in which light (or light pattern) incident to the DOE is duplicated 3 by 3.

Referring to FIG. 3, a light source unit 300 of the related art lighting device includes a plurality of light emitting elements 300a, 300b, 300c, 300d, and 300e. In the light source unit 300, the plurality of light emitting elements 300a, 300b, 300c, 300d, and 300e can be disposed to form a specific pattern, or only some of the plurality of light emitting elements 300a, 300b, 300c, 300d, and 300e, among a larger number of light emitting elements, can be turned on to form the specific pattern.

Here, when a plurality of light beams output from the plurality of light emitting elements pass through the DOE, the plurality of light beams can be split into a first type of light beam 310 not diffracted by the DOE and a second type of light beams 320a, 320b, 320c, 320d, 320e, 320f, 320g, 320h diffracted by the DOE.

When any one light beam is irradiated on the DOE, a portion of the light can pass through the DOE, without being diffracted by the DOE (or non-diffracted or refracted). That is, a portion of the light can pass through the DOE, in a state of maintaining straightness (or straightly), without being diffracted or refracted by the DOE.

Thus, in this disclosure, the non-diffracted portion of light will be termed a first type of light. Here, the first type of light may refer to zero-order light (or 0th light). Referring to FIG. 3, the number of first type of light beams 310 can be equal to the number of the plurality of light emitting elements 300a, 300b, 300c, 300d, 300e.

In addition, when any one light beam is irradiated on the DOE, the other portion excluding the one portion of light beam is diffracted (or refracted) by the DOE. Here, the other remaining portion of light can be diffracted (or refracted) in a plurality of directions, i.e., in different directions. In the present disclosure, the other diffracted (or refracted) remaining portion of light will be leaded a second type of light. Here, the second type of light may refer to a first-order light (or first light).

Referring to FIG. 3, the number of a plurality of second type of light beams 320a, 320b, 320c, 320d, 320e, 320f, 320g, 320h diffracted by the DOE can be varied depending on design of the DOE and may generally be larger than the number of a plurality of light emitting elements. Here, the first type of light, which is zero-order light, and the second type of light, which is first-order light, can pass through one DOE, for example. For example, as illustrated in FIG. 3, when light output from the plurality of light emitting elements passes through only one DOE, the corresponding light may include a first type of light (zero-order light) and a second type of light (first-order light).

In addition, when light passes through at least two DOEs, the first type of light and the second type of light may include light of different orders. For example, light output from a single optical element passes through a first DOE, the light can be split into non-diffracted zero-order light and diffracted first-order light.

Thereafter, when the zero-order light and the first-order light pass through a second DOE, the corresponding light which has passed through the second DOE may include zero-order light and first-order light which have not been diffracted by the second DOE and first-order light and second-order light which have been diffracted by the second DOE. Here, the diffracted first-order light can be light which has been diffracted from the zero-order light, and the diffracted second-order light can be light which has been diffracted from the first-order light.

In addition, the first type of light may include zero-order light and first-order light which has not been diffracted by the second DOE after passing through the first DOE. Also, the second type of light may include first-order light and second-order light which have been diffracted by the second DOE after passing through the first DOE.

That is, the first type of light described in this disclosure refers to light which is not diffracted by a final DOE, when at least one DOE is provided. Also, the second type of light refers to light diffracted by the final DOE. That is, the first type of light can include light not diffracted by the final DOE, among a plurality of light beams irradiated on a subject. Also, the second type of light can include light diffracted by the final DOE, among the plurality of light beams irradiated on the subject.

In the related art, as illustrated in FIG. 3, the lighting device (or the DOE) can duplicate a light pattern by patterns (or in units of patterns) formed by a plurality of light emitting elements. In more detail, the related art lighting device can diffract (duplicate) a light pattern emitted from the plurality of light emitting elements by the DOE such that light patterns do not overlap by patterns.

Thus, the related art lighting device includes a DOE formed such that an angle between the first type of light (e.g., zero-order light) and the second type of light (e.g., the first-order light) is an angle at which a pattern formed by the first type of light and a pattern of the second type of light do not overlap. Accordingly, a pattern formed by the plurality of light emitting elements, a pattern formed by the first type of light 310, and patterns formed respectively by the second type of light beams 320a, 320b, . . . 320h can be the same as illustrated in FIG. 3.

Also, the related art lighting device can irradiate light such that the pattern formed by the first type of light 310 and the patterns formed by the second type of light beams (320a, 320b, . . . , 320h) do not overlap each other. In other words, the related art lighting device can have a DOE irradiating light such that a region to which the first type of light 310 is irradiated (or a region formed by connecting points to which the first type of light is irradiated) and regions to which the second type of light beams 320a, 320b, . . . , 320h are irradiated (or a region formed by connecting points to which the second type of light is irradiated) do not overlap with each other.

That is, the related art lighting device simply duplicates a pattern formed by light output from the plurality of light emitting elements into a plurality of light beams by patterns and irradiates the same such that the patterns do not overlap, whereby the related lighting device merely serves to expand a field of view (FOV) to which light is irradiated, while irradiating optical spots greater than the number of the plurality of light emitting elements. f Accordingly, in the related art, since the first type of light and the second type of light are irradiated on the subject such that they do not overlap each other, it is impossible to increase the number of light beams (optical spots) irradiated per unit area (that is, it is impossible to increase density of light (optical spots)).

In other words, as illustrated in FIG. 3, since the related art lighting device duplicates a pattern of light output from the plurality of light emitting elements 300a, 300b, 300e not to overlap by patterns, thereby merely increasing the number of output light beams (optical spots) and the FOV to which light is irradiated, without changing a density of light indicating the number of light beams (optical spots) per unit area.

Meanwhile, the present disclosure provides a lighting device capable of irradiating light such that the number of light beams (optical spots) irradiated per unit area is increased (that is, such that density of light (optical spots) is increased). Hereinafter, a lighting device related to the present disclosure will be described in detail with reference to the accompanying drawings.

Figure 4:
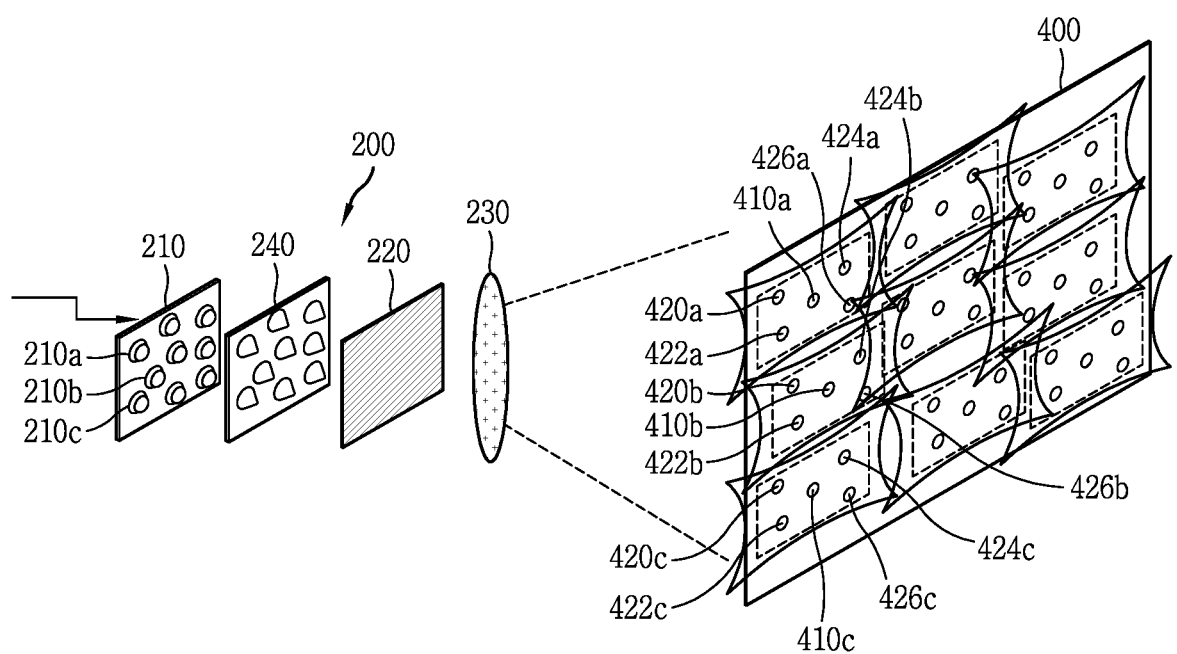
FIG. 4 is a conceptual view illustrating a lighting device provided in a mobile terminal in accordance with one embodiment of the present invention.

In particular, FIG. 4 is a conceptual view illustrating a lighting device provided in a mobile terminal according to one embodiment of the present invention. First, referring to (a) of FIG. 4, a lighting device 200 related to the present disclosure includes a plurality of light emitting elements 210a, 210b, 210c, . . . and a DOE 220 diffracting a portion of light output from each of the plurality of light emitting elements.

The plurality of light emitting elements can be laser diodes and, for example, can be vertical cavity surface emitting lasers (VCSELs). The plurality of light emitting elements can be provided in a die and can be disposed to form a specific pattern or at least some of the plurality of light emitting elements forming the specific pattern can be turned on. The specific pattern can be determined when the lighting device is generated or can be varied by changing light emitting elements which are turned on.

The die including the plurality of light emitting elements 210a, 210b, 210c, . . . can be termed a light emitting unit 210. Hereinafter, the plurality of light emitting elements can be denoted by the reference numerals 210a, 210, 210c, . . . , and the die including the plurality of light emitting elements will be denoted by reference numeral 210.

The DOE220 can be disposed in a direction in which the plurality of light emitting elements output light. The DOE220 can diffract a portion of light output from the light emitting elements and not diffract the other remaining portion of light. That is, the DOE220 can diffract a portion of light output from the light emitting elements and allow the same to pass therethrough and allow the other remaining portion of light to pass therethrough in a non-diffracted state (that is, straightly).

Referring to FIG. 4, light output from the plurality of light emitting elements and passing through the DOE 220 may include a plurality of first type of light beams 410a, 410b, 410c, . . . not diffracted by the DOE 220 and a plurality of second type of light beams 420a, 422a, 424a, 426a, 420b, 422b, 424b, 426b, 420c, 422c, 424c, 426c, . . . diffracted by the DOE 220.

The plurality of first type of light beams refer to light beams passing through the DOE 220 straightly (without being diffracted) after being output from the plurality of light emitting elements. Also, the plurality of second type of light beams refer to light beams diffracted by the DOE 220 and passing through the DOE 220 after being output from the plurality of light emitting elements.

The DOE 220 can diffract (split) one light into a plurality of light beams. Here, the DOE 220 can diffract light to have a specific pattern with respect to each of the light emitting elements, rather than diffracting light by patterns in a state of maintaining patterns of a plurality of light beams output from the plurality of light emitting elements, and in this sense, the DOE 220 is different from the related art DOE in FIG. 3. That is, the DOE of the present disclosure can diffract incident light such that a specific pattern is formed per light output from the light emitting element.

In addition, the lighting device of the present disclosure may further include various types of refractive optical elements (e.g., a microlens array 240, a reflective lens, a projection lens 230, a collimator lens, a grating cell array (GCA), a mirror/prism array, a fly eye lens, a double refraction element, etc.) The lighting device of the present disclosure may include at least one of the refractive optical elements, and disposition positions of the refractive optical elements and refractive optical elements may vary.

For example, the microlens array 240 can be disposed between the plurality of light emitting elements 210 and the refractive optical element 220, and the projection lens 230 can be disposed in a direction in which light which has passed through the DOE travels such that light beams which have passed through the DOE can be incident thereto.

The various lenses can be used to refract light output from the plurality of light emitting elements such that the light can be incident to an optimized position of the DOE or change a FOV in which the light which has passed through the DOE travels. For example, microlenses provided in the microlens array 240 can be disposed in positions corresponding to the number of the plurality of light emitting elements 210a, 210b, 210c, 210d, 210e.

The microlens array 240 can diffract light output from the plurality of light emitting elements such that a plurality of light beams output from the plurality of light emitting elements are incident to be perpendicular to the DOE. In another example, the microlens array 240 can diffract light beams output from the plurality of light emitting elements such that all of the plurality of light beams output from the light emitting elements disposed in different positions are incident to the center of the DOE.

The projection lens 230 can be formed such that an FOV in which the plurality of first type of light and the plurality of second type of light which have passed through the DOE 220 travel is large. That is, when a plurality of light beams which have passed through the DOE 220 are incident, the projection lens 230 can diffract the plurality of light beams and output to have an FOV larger than an FOV of the plurality of incident light beams.

The FOV in which the plurality of light beams passed through the projection lens 230 travel can be larger than a FOV in which a plurality of light beams not passed through the projection lens 230 travel. The FOV can be determined when a product is released or can be determined according to a user design, and when the projection lens is formed to have a variable bending modulus, the FOV can be varied.

In the present disclosure, it is described that the DOE splits (duplicates) incident light. However, the present disclosure is not limited thereto and the lighting device of the present disclosure may also be applied to using the aforementioned refractive optical element instead of the DOE or to combining the DOE and the refractive optical element. More specifically, the lighting device of the present invention can be configured to diffract or split light emitted therefrom using a refractive optical element (e.g., at least one of a grating cell array (GCA), a mirror/prism array, a micro lens array, a fly eye lens and a birefringent element, or a combination of two of them), in replacement of a diffractive optical element.

Descriptions of the DOE hereinafter may also be inferred and applied to using the refractive optical element or to combining the DOE and the refractive optical element in the same/similar manner. The DOE 220 of the present disclosure can duplicate light output from one light emitting element such that light output from one light emitting element has a specific pattern, rather than duplicating light by patterns formed by light output from a plurality of light emitting elements (that is, a pattern in which the plurality of light emitting elements are disposed).

For example, FIG. 4 illustrates that light output from one light emitting element is split into five light beams through the DOE 220. Here, among the five light beams, a first type of light is one 410a, and second type of light can be the other remaining four light beams 420a, 422a, 424a, and 426a. Optical spots to which the five light beams are irradiated can form a specific pattern.

The DOE of the present disclosure can be provided to split one light output from one light emitting element to form a specific pattern, rather than duplicating a pattern in which a plurality of light emitting elements are disposed by patterns as illustrated in FIG. 3. Thus, splitting, by the DOE 220, one light to form a specific pattern can be applied to light output from each of the plurality of light emitting elements.

In this instance, to a plane 400 spaced apart from the lighting device 200 by a predetermined distance, light beams respectively output from the light emitting elements are irradiated on have a specific form, rather than that forms of the pattern in which the plurality of light emitting elements are disposed are duplicated and irradiated by patterns.

Thus, the DOE of the present disclosure is different from the related art DOE of FIG. 3 in that, although the plurality of light emitting elements are provided, one light output from each of the light emitting elements is split into several light beams to form a specific pattern. Unlike the related art of replicating light so as not to overlap each other per each pattern unit in which a plurality of light emitting elements are arranged, the lighting device of the present invention can diffract (replicate) light so as to have a specific pattern per each light output from one light emitting element.

Thus, the region occupied by the pattern formed by the plurality of first type of light beams and the region occupied by the pattern formed by the plurality of second type of light beams (the pattern formed by the plurality of second type of light beams diffracted in the same direction) partially overlap each other. That is, the pattern formed by the first type of light and the plurality of second types of light diffracted in the same direction may correspond to a pattern in which a plurality of light emitting elements are arranged.

In addition, referring to FIG. 3, since the related art lighting device splits (duplicates) the plurality of light beams output from the plurality of light emitting elements so as not to overlap the light per each pattern unit in which the plurality of light emitting elements are arranged, a region occupied by the pattern of the first type of light beam 310 and a region occupied by the pattern of the second type of light beam 320a do not overlap each other.

By the lighting technology described above, the lighting device of the present disclosure increases the number (i.e., density of light) of light beams (optical spots) irradiated per unit area C.

Figure 5:
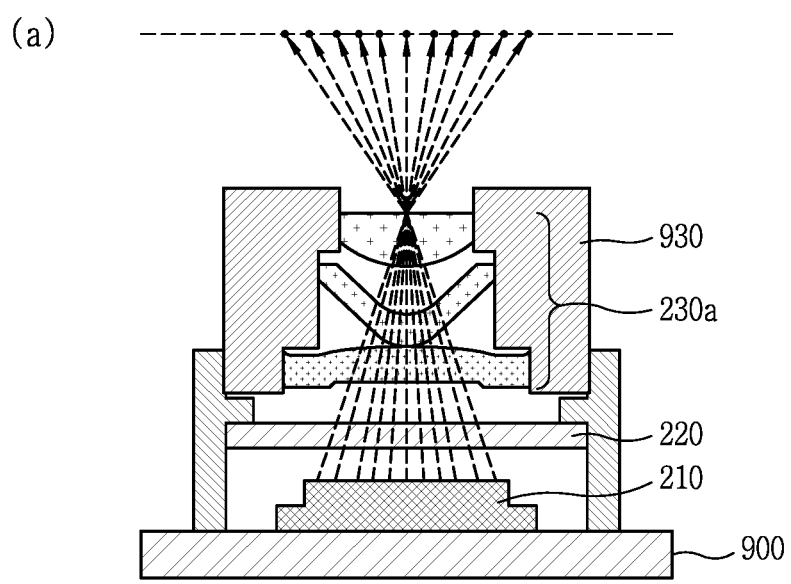
FIG. 5 is a conceptual view illustrating a lens applicable to the present invention.
Figure 5:
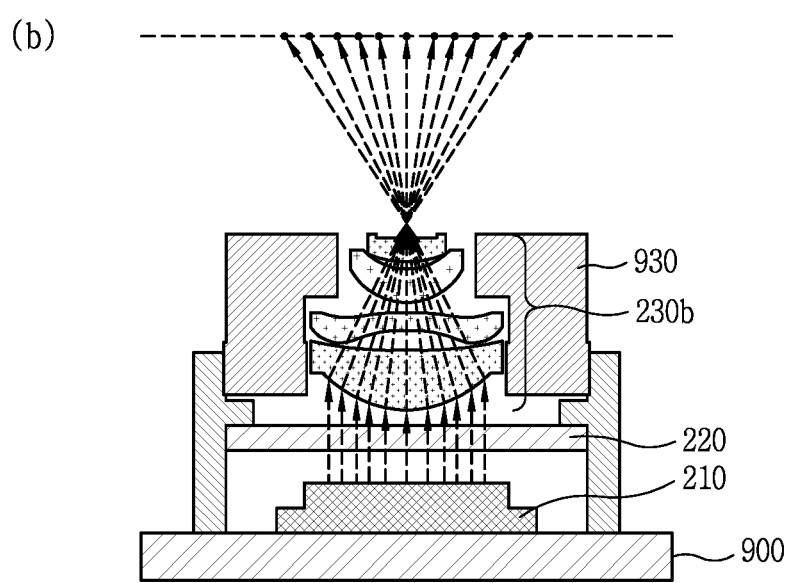

Next, FIG. 5 is a conceptual view illustrating a lens applicable to the present invention. First, a schematic structure of a lighting device 200 related to the present invention will be described. In addition, the lighting device 200 related to the present invention may include a printed circuit board 900.

The printed circuit board 900 may include a printed circuit board (PCB) or a printed wiring board (PWB). The printed circuit board 900 can be provided with a circuit printed (placed, mounted) thereon and capable of transmitting an electric signal. At least one of the components illustrated in FIG. 1 can be disposed on the printed circuit board 900, and the components can be configured to transmit and receive electrical signals.

The lighting device 200 related to the present invention may include a submount mounted (arranged, coupled) on the printed circuit board 900. In addition, the lighting device 200 related to the present invention may include a die 210 mounted on the submount and having a plurality of light emitting elements.

The submount may perform a heat dissipating function. Specifically, the submount is configured to dissipate heat generated by the die 210 disposed on the submount (specifically, heat generated by light emission of the plurality of light emitting elements provided on the die 210). For example, the submount can be made of a heat-dissipating material and can be named as a heatsink. The die 210 may include the plurality of light emitting elements 210*a*, 210*b*, . . . described with reference to FIGS. 3 and 4. For example, each of the plurality of light emitting elements can be a laser diode or a VCSEL.

In addition, the light emitting elements of the present invention can be provided on the printed circuit board. The fact that the light emitting elements are provided on the printed circuit board should be understood as meaning that the light emitting elements (or the die 210) are provided on the submount disposed on the printed circuit board, meaning that the light emitting elements (or the die 210) are directly mounted on the printed circuit board, and the like.

The lighting device 200 according to an embodiment of the present invention may include a pad that is inserted into a hole formed in the submount, connected to the die 210 in a wire bonding manner, and electrically connected to the printed circuit board 900, so that the die 210 and the printed circuit board 900 are electrically connected through the submount.

That is, referring to FIG. 5, the lighting device 200 according to an embodiment of the present invention may include the printed circuit board 900, the submount mounted on the printed circuit board 900, the die 210 mounted on the submount and having the plurality of light emitting elements, and the pad inserted into the hole formed in the submount, connected to the die 210 in the wire bonding manner, and electrically connected to the printed circuit board 900, so that the die 210 and the printed circuit board 900 are electrically connected through the submount.

The wire bonding, the hole and the pad can be provided in plurality in number. For example, the number of the hole and the pad may correspond to the number of the wire bonding on the die 210. The submount can be provided with a plurality of holes. The holes provided in the submount can be formed through the submount. In one example, the holes may include via holes.

In each of the holes, the pad can be inserted (placed, arranged). The pad can be made of a conductive material and referred to as a bonding pad. The pad can be inserted into the hole formed through the submount so as to be connected to the die 210 by the wire bonding. Further, the pad can be inserted through the hole of the submount to be electrically connected to the printed circuit board 900.

The pads inserted through the holes formed through the submount allow the die 210 and the printed circuit board 900 to be electrically connected to each other through the submount. Specifically, the plurality of light emitting elements provided in the die 210 and (the circuit provided on) the printed circuit board 900 can be electrically connected through the submount owing to the pads inserted through the submount.

Also, an area of the submount can be larger than an area of the die 210. This is for the wire bonding between the die 210 and the pads inserted through the holes formed through the submount. Further, the lighting device according to an embodiment of the present invention, as illustrated in FIG. 5, may include a holder 930 provided on the printed circuit board 900 to surround (cover, include, accommodate) the die 210 and the submount.

The holder 930 may have an inner space which is formed together with the die 210. The inner space is preferably in a vacuum state without air but may not be in the vacuum state. The holder 930 can be formed to surround (cover, include, accommodate) the die 210, the submount, the pads inserted through the holes formed through the submount, and the wire bonding connecting the die 210 and the pads.

The holder 930 can serve as a case in that the holder 930 is formed to surround the die 210, the submount, the wire bonding, the pad, and the like. Further, the holder 930 can be formed as a single case or a combination of a plurality of cases. In addition, the inner space can be formed between the holder 930 and the die 210.

The lighting device 200 of the present invention includes a diffractive optical element (DOE) 220 disposed in the inner space between the holder 930 and the die 210 and mounted (arranged) by the holder 930. The DOE 220 can be positioned in an optical axis direction of the plurality of light emitting elements so that light output from the plurality of light emitting elements of the die 210 can pass therethrough.

The DOE 220 can be the DOE described above with reference to FIG. 4. The DOE 220 may or may not be provided selectively according to the user's design. In addition, the lighting device 200 of the present invention can diffract light emitted therefrom or split the light into a plurality of light beams using a refractive optical element (e.g., at least one of a grating cell array (GCA), a mirror/prism array, a micro lens array, a fly eye lens and a birefringent element, or a combination of two of them), in replacement of the DOE.

Hereinafter, description of the DOE may also be inferred and applied to using the refractive optical element or to combining the DOE and the refractive optical element in the same/similar manner. The holder 930 of the lighting device 200 of the present invention can be provided with a lens 230 (230*a*, 230*b*) through which light output from the plurality of light emitting elements provided in the die 210 is transmitted. That is, the lens 230 can be mounted (placed) in the holder 930 and located in the optical axis direction of the plurality of light emitting elements such that light emitted from the plurality of light emitting elements (or light passed through the DOE 220) can be transmitted therethrough.

The light output from the plurality of light emitting elements provided in the die 210 can be diffracted (split or replicated) by the DOE 220, and the diffracted (split or replicated) light can then be incident on the lens 230 and transmitted through the lens 230 to be output to an external space. The holder 930 can be provided with the lens 230 through which light output from the plurality of light emitting elements provided in the die 210 is transmitted. The lens 230 may include at least one of the microlens array, the reflective lens, the collimator lens, the grating cell array (GCA), the mirror/prism array, the fly eye lens, the double refraction element, etc.

The lens 230 allows the light diffracted by the DOE 220 to be incident on the subject. In addition, the lens 230 allows light output from the plurality of light emitting elements 210a, 210b, 210c, and 210d or light that has passed through the DOE 220 to be transmitted therethrough.

The lens 230 provided in the lighting device 200 of the present invention can be a general lens 230a as illustrated in (a) of FIG. 5 or can be a telecentric lens 230b as illustrated in (b) of FIG. 5. The telecentric lens refers to a lens in which incident light or emitted light is parallel to the optical axis. Specifically, the telecentric lens refers to a lens whose chief ray angle (CRA) condition of light incident on the lens is 0 in all fields. That is, the fact that the CRA of the light incident on the lens is 0 refers to that light is parallel to the optical axis.

Efficiency of the DOE can be increased by making a condition that the CRA at which light transmitted through the telecentric lens is incident on the DOE is perpendicularly incident at 0° in all regions. Accordingly, the telecentric lens can provide the same magnification at all distances.

The lighting device of the present invention, as illustrated in (a) of FIG. 5, can also use the general lens 230a having a CRA which is not 0°, instead of the telecentric lens 230b. In this instance, a plurality of lights output from the plurality of light emitting elements and passed through the DOE can be incident on the general lens 230a so the CRA is not 0°.

For example, for the general lens 230a, the CRA at which light output from a light emitting element located at a center is incident on the general lens 230a is 0°, but the CRA at which light output from a light emitting element located at a distance from the center is incident on the general lens 230a can be about 30°. That is, when the general lens 230a is used, the CRA of the DOE can be in the range of about 0° to 30°.

In addition, for the telecentric lens 230b, the CRAs at which the light output from the light emitting element located at the center and the light output from the light emitting element disposed at a distance from the center are incident on the telecentric lens 230b are all 0°. Here, the CRA refers to an angle at which light is transmitted through the DOE with respect to the optical axis of the DOE (that is, an upward direction to which light output from a light emitting element is directed, namely, 90° with respect to the ground).

As illustrated in (a) of FIG. 5, when the general lens 230a is provided, angles (CRAs) of light beams transmitted through the DOE, except for one light transmitted through a central portion, are not 0°. That is, only the one light at the central portion is transmitted through the DOE at 0°. Further, when the telecentric lens 230b is provided, as illustrated in (b) of FIG. 5, angles (CRAs) of light beams transmitted through the DOE can be all 0°.

That is, the lighting device of the present invention can be configured such that the plurality of light emitting elements emit light to have different angles (CRAs) or the DOE transmits incident light beams to have different angels from CRAs, when using the general lens. Further, the lighting device of the present invention can be configured such that the plurality of light emitting elements all perpendicularly output light beams or CRA and emission angle of the DOE are all 0°, when using the telecentric lens.

In general, as illustrated in (a) of FIG. 5, when the general lens is used, the number of lens layers (or the number of lenses and lens layers) is reduced (generally three) and thus a relatively small size can be realized. However, performance can be relatively deteriorated. In addition, with the general lens, as illustrated in (a) of FIG. 5, since light transmitted through the DOE is incident toward the central portion of the lens, a size of the lighting device in the left and right direction can be decreased, thereby reducing a volume of the lighting device.

When the general lens is used, the size of the lighting device can be about 3*3*2.5 to 4*4*4.5 mm (excluding the PCB). Further, when using the general lens, a brightness of a peripheral portion (brightness of light output from a light emitting element located at a distance from the center of the die) of a light pattern irradiated on the subject can be lowered due to the problem of performance deterioration. However, since there is not much refraction of a CRA, distortion of a light pattern irradiated on the subject is less caused.

Further, when the telecentric lens is used as illustrated in (b) of FIG. 5, the number of lens layers relatively increases (four in general). Therefore, the size of the lighting device in a height direction can more increase than that when the general lens is provided, which may result in increasing the volume of the lighting device. However, the performance of the lighting device can be relatively improved compared to the use of the general lens.

Further, when the telecentric lens, as illustrated in (b) of FIG. 5, since light beams transmitted through the DOE are incident on the lens to all have a CRA of 0°, which may make it difficult to reduce the size of the lighting device in the left and right direction. In other words, an area of the telecentric lens cannot be reduced more than an area of the die provided with the plurality of light emitting elements, a volume of the telecentric lens is greater than that of the general lens.

When the telecentric lens is used, the lighting device may have a size of about 4*4*3 to 6*6*5 mm (excluding the PCB). When the telecentric lens is used, the lighting device exhibits relatively good performance. Therefore, a brightness of a peripheral portion of a light pattern irradiated on the subject (brightness of light output from a light emitting element located at a distance from the center of the die) is excellent. However, since such light beams are incident on the lens all at the CRA of 0°. Accordingly, refraction of the light within the lens increases, which may cause pattern distortion.

The lighting device described in this specification may include the general lens and/or the telecentric lens described in FIG. 5. In addition, the lighting device 200 of the present invention can be allowed to vary a light pattern irradiated on the subject in order to extract depth information related to an image captured through a camera in an optimized manner.

Hereinafter, the lighting device 200 capable of varying a light pattern will be described in more detail with reference to the accompanying drawings. In particular, FIG. 6 is a conceptual view illustrating a representative lighting device in accordance with the present invention.

Figure 6:
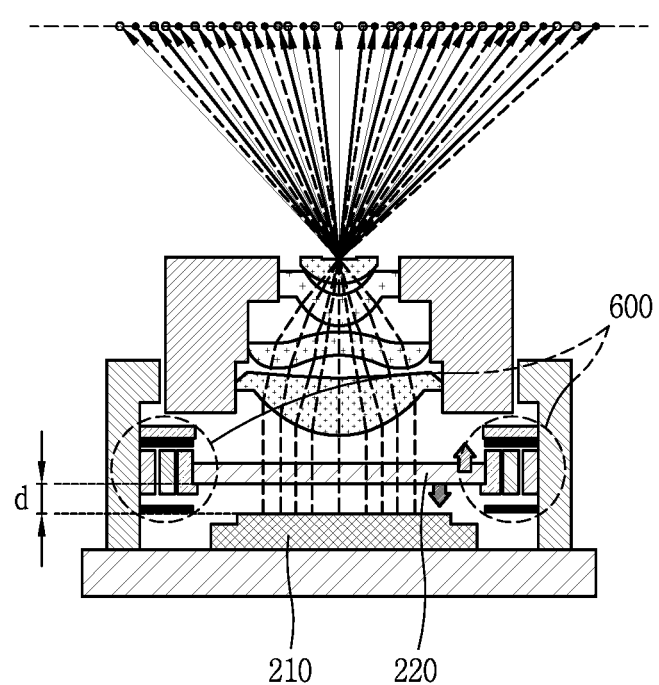
FIG. 6 is a conceptual view illustrating a representative lighting device in accordance with the present invention.

Referring to FIG. 6, the lighting device 200 of the present invention may include the plurality of light emitting elements 210a, 210b, 210c, 210d, . . . . The light emitting element may include a laser diode, for example, a VCSEL. As described above, the light emitting elements can be plural, and can be provided (arranged) in the die 210, as illustrated in FIG. 6. As described above, the die 210 (or the light emitting elements) can be provided on the printed circuit board or on the submount provided on the printed circuit board.

Hereinafter, in order to more clearly explain the change of a light pattern, one light emitting element will be described as a reference. The following description will also be applied to including a plurality of light emitting elements in the same/like manner In the following description, reference numerals 210, 210a, or 210b are used in combination for the light emitting element.

The lighting device 200 of the present invention may include a diffractive optical element (DOE) that diffracts part of light output from the light emitting element (or the die 210). The DOE 220 can replicate (split or diffract) one light output from one light emitting element (one light source) into a plurality of light beams. For example, one light incident on the DOE 220 can pass through the DOE 220 by being split into one first type of non-diffracted light beam (zero-order light) and a plurality of second type of diffracted light beam (first-order light).

Through the DOE, the present invention can use N light emitting elements 210 (light sources) to irradiate light spots more than N to the subject. That is, the DOE can split one light output from the light emitting element 210 into a plurality of light beams. The plurality of light beams can be irradiated on a subject spaced a predetermined distance from the light emitting element. In addition, the plurality of light beams split by the DOE can be irradiated on the subject through the lens 230.

Also, as illustrated in FIG. 6, the lighting device 200 of the present invention includes a driving unit 600 to move the DOE 220 to vary a distance between the light emitting element (or the die 210) and the DOE 220. The driving unit 600 can be disposed in the inner space of the holder 930 to support the DOE 220.

The driving unit 600 can be configured to move the DOE 220 in one direction (for example, a direction of an axis (optical axis) corresponding to an up and down direction or a direction that light output from the light emitting element 210 is transmitted). The DOE and the light emitting element 210 (die) can be spaced apart from each other by a predetermined distance d.

The DOE 220 disposed on the driving unit 600 can be moved away from or close to the light emitting element 210 (die) by an operation (control) of the driving unit 600. When the DOE 220 is moved by the driving unit 600, the distance between the DOE 220 and the light emitting element 210 (die) is varied.

The driving unit 600 can be driven under the control of the controller 180 of the mobile terminal or can be driven by a processor of the lighting device. For example, a driving range of the driving unit 600 (that is, a movable distance of the DOE) can be about −0.5 mm to +0.5 mm. The driving unit 600 may include all kinds of actuators (or motors) configured to move the DOE. The driving unit configured to move a certain component (for example, the DOE) is a general technique, and thus a detailed description thereof will be omitted.

The lighting device 200 of the present invention can vary a light pattern irradiated on a subject by varying the distance between the light emitting element 210 and the DOE. The light emitting element 210 is provided on a printed circuit board and can emit light of a specific pattern.

Specifically, when one light output from one light emitting element 210 is split (diffracted) into a plurality of light beams by the DOE 220, the plurality of light beams can be irradiated on the subject spaced apart from the light emitting element 210 (or the lighting device, or the die) by the predetermined distance. In addition, the light output from the light emitting element can be split by the DOE, transmitted through the lens and irradiated on the subject.

In addition, when the distance between the light emitting element 210 and the DOE 220 is a first distance, a first light pattern can be irradiated on the subject. Also, when the distance between the light emitting element 210 and the DOE 220 is changed by the driving unit 600 to a second distance different from the first distance, a second light pattern different from the first light pattern can be irradiated on the subject.

That is, the light transmitted through the lens can be irradiated as the first light pattern on the subject when the distance between the light emitting element and the DOE is the first distance, while being irradiated as the second light pattern on the subject when the distance between the light emitting element and the DOE is changed by the driving unit to the second distance different from the first distance.

In addition, the first light pattern and the second light pattern can be different from each other. Specifically, the first light pattern and the second light pattern can be different light patterns. The fact that the first light pattern and the second light pattern are different from each other means that a plurality of light have different arrangements (different forms), and that the plurality of light have the same arrangement but only a stance between the plurality of light beams is varied, so that points where the plurality of light beams are irradiated on the subject (or points where optical spots are generated (irradiated) on the subject) are changed.

For example, when the first light pattern is a light pattern of a 4 by 3 form (arrangement), the second light pattern can be a light pattern of a 2 by 6 foam different from the first light pattern. As another example, when the first light pattern is the 4 by 3 type light pattern and the distance between the light beams is a first distance, the second light pattern has the 4 by 3 form (or type) but the distance between the light beams has a second distance different from the first distance. In this instance, although a light pattern having the same form (arrangement) is irradiated on the subject, the distance between the light beams is varied. Thus, the density (resolution) of the plurality of light beams irradiated on the subject can be changed.

Further, since the distance between the light beams is different, a position at which light is irradiated on the object also changes. Accordingly, even if the first light pattern and the second light pattern have the same form (for example, 4 by 3), when the distance between light beams is changed, it can be understood as different light patterns.

Also, the fact that the second light pattern different from the first light pattern is irradiated on the subject may refer to that at least some of light beams transmitted (passed) through the lens is irradiated on different positions. Specifically, light (a plurality of light beams) transmitted through the lens can be irradiated on a first position of the subject when the distance between the light emitting element and the DOE is a first distance, while being irradiated on a second position of the subject when the distance between the light emitting element and the DOE is changed to a second distance different from the first distance.

In this instance, the first position of the subject can be different from the second position of the subject. In addition, part (first light) of the plurality of light beams transmitted through the lens may not be diffracted and thus can be irradiated on the same position of the subject when the distance between the light emitting element and the DOE is the first distance and when such distance is the second distance.

Further, since the other part (second light) of the plurality of light beams transmitted through the lens is diffracted by the DOE, the other part of the light beams can be irradiated on a second position different from the first position of the subject when the distance between the light emitting element and the DOE is the second distance. That is, at least part of light (a plurality of light beams) transmitted through the lens can be irradiated on the second position of the subject different from the first position of the subject when the distance between the light emitting element and the DOE is changed by the driving unit to the second distance different from the first distance.

The controller 180 can extract depth information related to an image received through the camera 121 using the light beams irradiated on the first position of the subject and the second position of the subject, so that resolution of the depth information related to the image can be enhanced. The first light pattern and the second light pattern can be the same pattern. For example, the first light pattern and the second light pattern may have the same form (for example, 4 by 3) and the same distance between the light beams.

The first light pattern and the second light pattern can be irradiated on different positions of the subject even if they have the same form or arrangement and the same distance between the light beams. For example, when the distance between the light emitting element and the DOE is the first distance, the first light pattern can be irradiated on the first position (or a first region) of the subject. When the distance between the light emitting element and the DOE is changed by the driving unit to the second distance different from the first distance, the second light pattern which is the same as the first light pattern can be irradiated on the second position (or a second region) different from the first position of the subject.

That is, the first light pattern and the second light pattern can be output as the same light pattern (the pattern in which the irradiated shape of the plurality of light beams and the distance between the light beams are the same) from the lighting device but irradiated on different positions of the subject, based on the change in the distance between the light emitting element and the DOE when a distance between the lighting device and the camera is constant.

For example, the structure that the first and second light patterns are output as the same light pattern (i.e., the pattern in which the irradiated shape of the plurality of light beams and the distance between the light beams are the same) from the lighting device but irradiated on the different positions of the subject can be implemented when the DOE of the present invention is an active type.

That is, for the active type DOE, when the distance between the lighting device and the camera is constant, only the position at which light is irradiated on the subject can be varied while maintaining the same light pattern, in response to the change in the distance between the light emitting element and the DOE.

A distance between a plurality of light (or light spots) corresponding to the plurality of light beams irradiated on the subject can be varied based on the distance between the light emitting element 210 and the DOE 220. More specifically, when the distance between the light emitting element 210 and the DOE 220 is changed by the driving unit 600, a distance between a plurality of light beams (or the plurality of light spots corresponding to the plurality of light beams) irradiated on the subject is also changed.

The fact that the distance between the plurality of light spots corresponding to the plurality of light beams irradiated on the subject is also changed may indicate that the light pattern of the plurality of light beams (or light spots) irradiated on the subject is also changed, or that the position where the plurality of light beams (or at least part of the plurality of light beams) are irradiated on the subject is changed.

Figure 7:
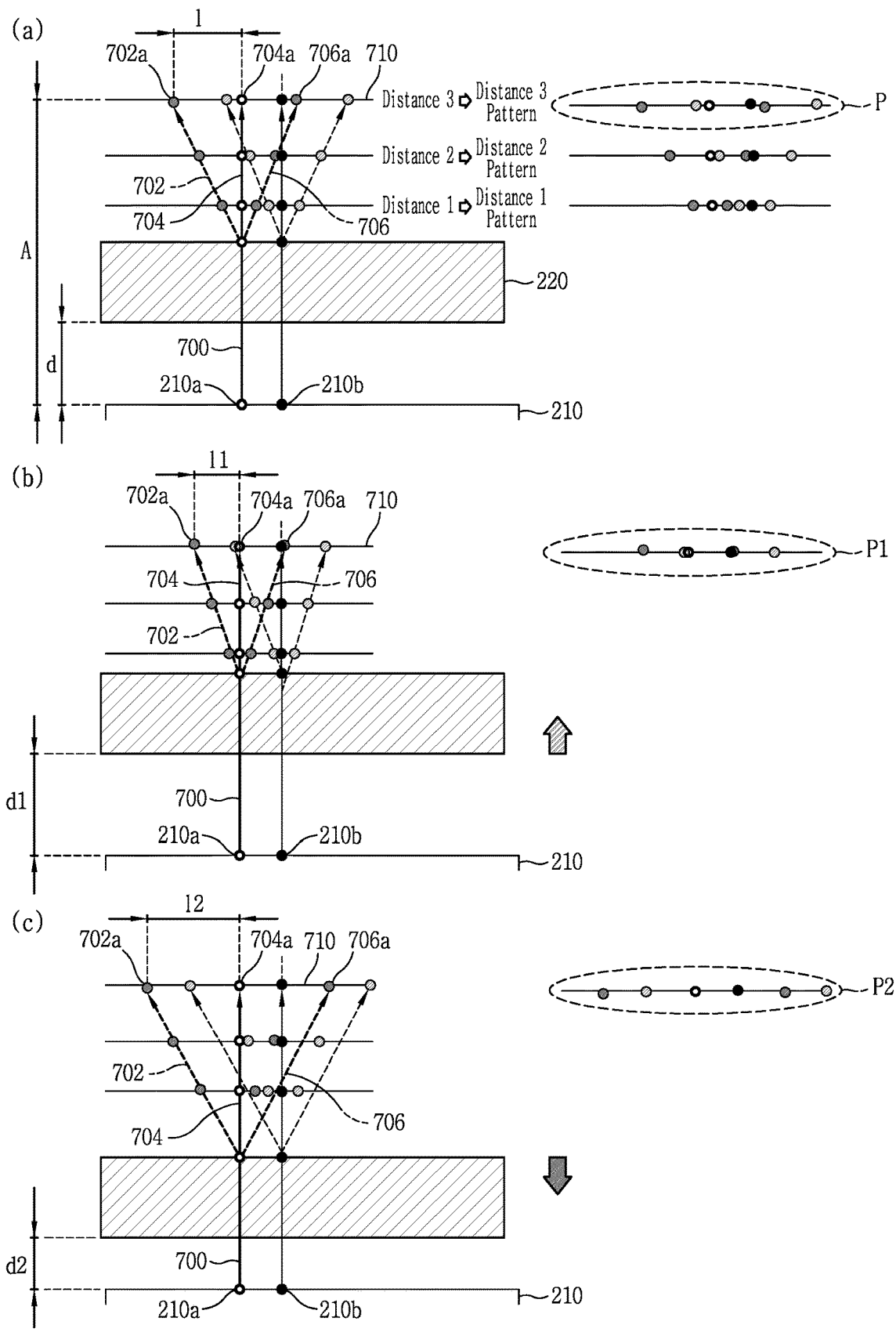
FIGS. 7 and 8 are conceptual views illustrating a method of controlling a light pattern output from a lighting device in accordance with one embodiment of the present invention.
Figure 8:
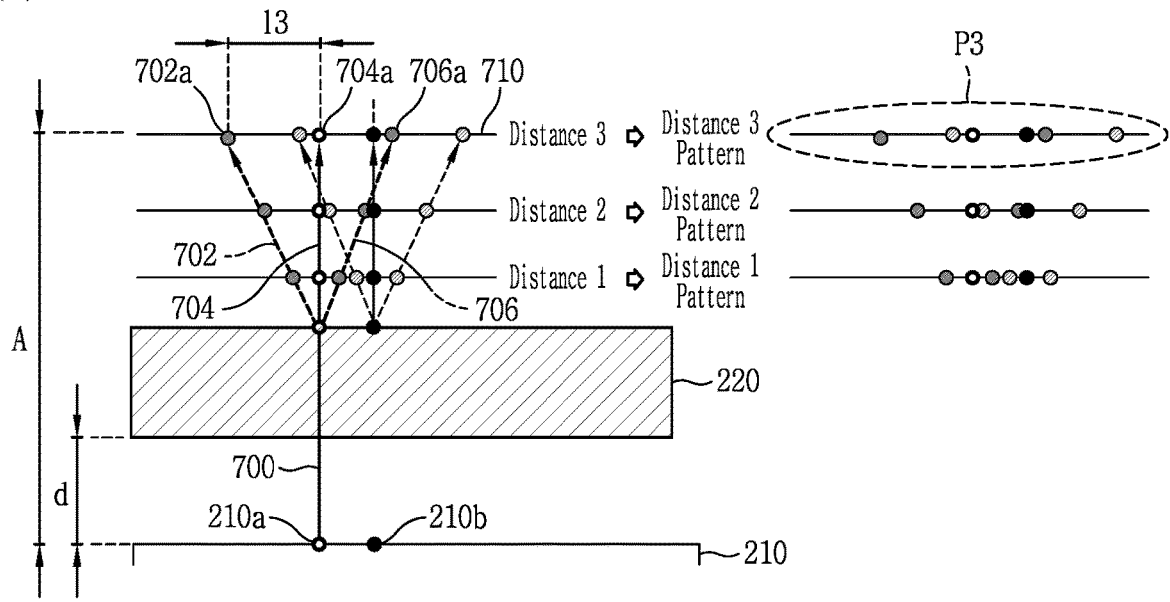
Figure 8:
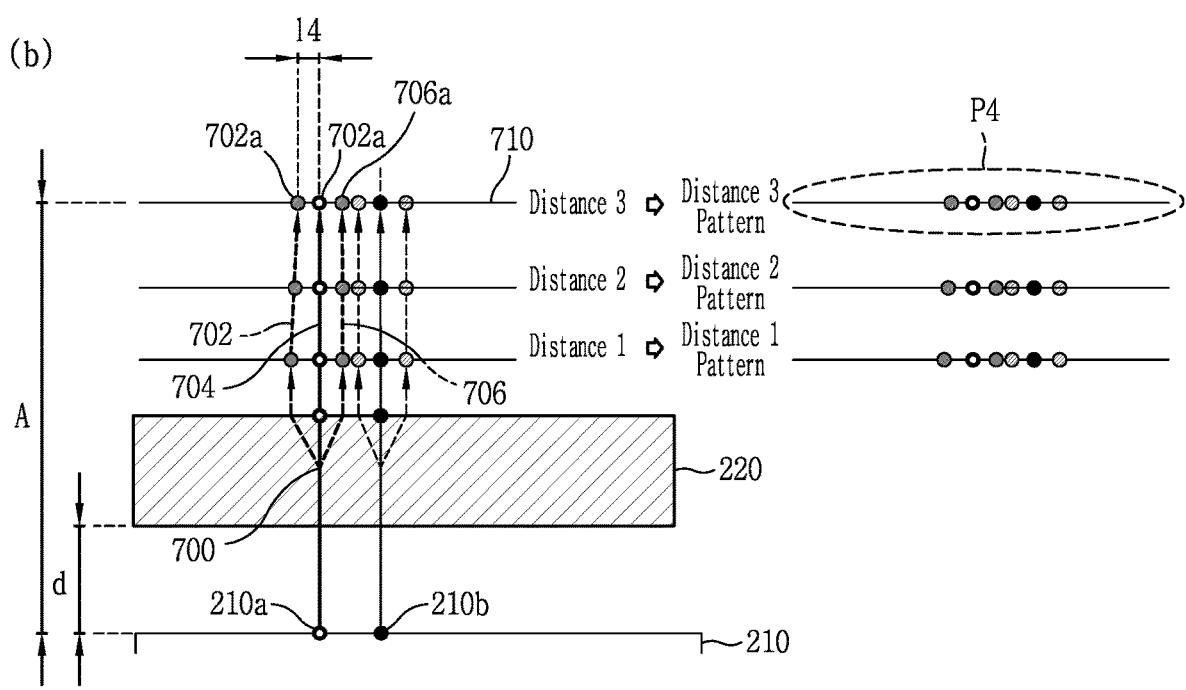

Hereinafter, the change of the light pattern irradiated on the subject will be described in more detail with reference to the accompanying drawings. In particular, FIGS. 7 and 8 are conceptual views illustrating a method of controlling a light pattern output from a lighting device in accordance with one embodiment of the present invention. Referring to FIG. 7(*a*), each of the light emitting elements 210*a* and 210*b* included in the die 210 output one light.

Hereinafter, when light output from the light emitting element 210*a* passes through the DOE 220 will be described as an example. One light 700 output from the light emitting element 210*a* can be split into a plurality of light beams 702, 704, and 706 by the DOE 220.

In addition, the plurality of split light beams may include a first type of light 704 (zero-order light) that is not diffracted by the DOE 220, and a plurality of second type of light beams (first-order light or first light) 702 and 706 diffracted by the DOE. The plurality of light beams 702, 704, and 706 split by the DOE 220 can be irradiated on the subject which is spaced a predetermined distance from the light emitting element (the die or the lighting device). In addition, when the subject is located at Distance 1, Distance 2 and Distance 3 from the light emitting element, as illustrated in (a) of FIG. 7, light patterns formed by the plurality of light spots corresponding to the plurality of light beams can be different from one another.

Hereinafter, description will be given under assumption that the subject 710 is located at Distance 3 spaced from the light emitting element by a predetermined distance A. A plurality of light spots 702*a*, 704*a*, 706*a* corresponding to the plurality of light beams 702, 704, and 706 which have been split by the DOE 220 can be irradiated on the subject 710. The first light beam 702 of the plurality of light beams corresponds to the first light spot 702*a*, the second light beam 704 of the plurality of light beams corresponds to the second light spot 704*a*, and the third light beam 706 of the plurality of light beams corresponds to the third light spot 706*a*.

FIGS. 7 and 8 illustrate that one light is split into three light beams, but the number of light split is not limited to this. When the distance between the light emitting element 210*a* and the DOE 220 is d, a distance between the plurality of light spots (for example, 702*a* and 704*a*) corresponding to the plurality of light beams split by the DOE can be 1.

Further, the distance between the plurality of light spots corresponding to the plurality of light beams can be varied based on the distance between the light emitting element and the DOE. For example, as illustrated in (b) of FIG. 7, when a distance d1 between the light emitting element 210*a* and the DOE is increased, a distance 11 between the plurality of light spots (for example, 702*a* and 704*a*) irradiated on the subject 710 can be shortened.

Also, as illustrated in (c) of FIG. 7, when a distance d2 between the light emitting element 210*a* and the DOE 220 is decreased, a distance 12 between the plurality of light spots (for example, 702*a* and 704*a*) irradiated on the subject 710 can be increased. In more detail, as illustrated in (b) of FIG. 7, when the distance between the light emitting element 210*a* and the DOE 220 is a first distance d1, the distance between the plurality of light spots (for example, 702a and 704a) can be a first spaced distance 11.

Also, as illustrated in (c) of FIG. 7, when the distance between the light emitting element 210a and the DOE 220 is a second distance d2 that is shorter than the first distance, the distance between the plurality of light spots (e.g., 702a and 704a) can be a second spaced distance 12 that is longer than the first spaced distance 11. As such, in the present invention, when the distance between the light emitting element and the DOE is changed by the driving unit which can vary such distance, the distance between the plurality of light beams (or light spots) irradiated on the subject can be changed.

Further, the lighting device of the present invention can vary density of light spots irradiated on the subject by using the driving unit which varies the distance between the light emitting element and the DOE. Here, the density of the light spots may refer to the number of the plurality of light beams (or light spots) irradiated per unit area of the subject.

As illustrated in (b) of FIG. 7, the density of the plurality of light beams (or light spots) increases as the distance between the light emitting element 210a and the DOE 220 increases. This is because the distance between the plurality of light beams (or light spots) decreases as the distance between the light emitting element and the DOE increases and thus the number of light spots irradiated per unit area increases.

Further, as illustrated in (c) of FIG. 7, the density of the light spot decreases as the distance between the light emitting element 210a and the DOE 220 becomes shorter. In other words, since the distance between the plurality of light spots increases as the distance between the light emitting element and the DOE is shortened, the number of light spots irradiated per unit area is reduced.

Also, as illustrated in (a) of FIG. 7, the plurality of light spots 702a, 704a, 706a, and the like irradiated on the subject 710 form a light pattern P. The light pattern P can be changed in response to a change in the distance d between the light emitting element 210a and the DOE.

For example, as illustrated in (b) of FIG. 7, when the distance between the light emitting element and the DOE is the first distance d1, the plurality of light spots 702a, 704a, 706a, and the like can be irradiated on the subject 710 to form a first light pattern (or a first lighting pattern) P1.

In another example, as illustrated in (c) of FIG. 7, when the distance between the light emitting element and the DOE is the second distance d2 different from the first distance d1, the plurality of light spots 702a, 704a, 706a, and the like can be irradiated on the subject 710 to form a second light pattern (or a second lighting pattern) P2 different from the first light pattern (or the first lighting pattern) P1.

According to this configuration, the present invention can change a light pattern irradiated on a subject by employing a driving unit that moves a DOE in one direction (e.g., an up-down direction or an optical-axis direction). In addition, the present invention provides a mobile terminal capable of extracting depth information related to an image captured through a camera in an optimized manner according to a situation by changing a light pattern.

Further, the DOE 220 of the present invention can be configured such that an output angle (an outgoing angle or an exit angle) of a plurality of light beams differ according to the distance between the light emitting element and the DOE. Here, the fact that the output angle differs means that an optical viewing angle at which the plurality of light beams is irradiated is changed.

For example, the DOE 220 can be configured such that the output angle at which a plurality of light beams is output increases as the distance between the light emitting element and the DOE becomes closer. When the distance between the light emitting element and the DOE is the first distance d1, the output angle (or the optical viewing angle) can be a first angle.

Further, when the distance between the light emitting element and the DOE is the second distance d2 shorter than the first distance, the output angle (or the optical viewing angle) can be a second angle larger than the first angle. Accordingly, the density of the light spots irradiated on the subject can be greater when the distance between the light emitting element and the DOE is the first distance than when the distance is the second distance. This is because the number of light spots irradiated per unit area increases, which results from that the output angle (or the optical viewing angle) at the first distance is smaller than that at the second distance.

With such configuration, the present invention provides a novel lighting device capable of varying a light pattern irradiated on a subject by moving a DOE. Further, the DOE 220 of the present invention, as illustrated in (a) of FIG. 8, can be configured to output (emit or diffuse) the plurality of split light beams 702, 704, and 706.

As another example, the DOE 220 of the present invention, as illustrated in (b) of FIG. 8, can be configured to irradiate in parallel the plurality of split light beams 702, 704, and 706. In this instance, the light pattern formed by the plurality of light spots irradiated on the subject 710 may differ (P3, P4) according to a light emission form of (a) and (b) of FIG. 8.

Further, referring to (a) of FIG. 8, the distance between the light spots 702a, 704a, and 706a irradiated on the subject may have a third spaced distance 13 when the distance d between the light emitting element and the DOE is the same and the DOE is configured to diffuse a plurality of light beams 702, 704, and 706.

Also, referring to (b) of FIG. 8, the distance between the light spots 702a, 704a, 706a irradiated on the subject may have a fourth spaced distance 14 that is shorter than the third spaced distance 13 when the distance d between the light emitting element and the DOE is the same and the DOE outputs the plurality of light beams 702, 704 and 706 in parallel.

In this instance, a density of a plurality of light spots corresponding to a plurality of light beams passed through the DOE for outputting the plurality of light beams in parallel can be greater than density of a plurality of light spots corresponding to a plurality of light beams passed through the DOE for outputting the plurality of light beams in a diffusing manner.

Also, as illustrated in (b) of FIG. 8, the description given with reference to FIG. 7 can be applied in the same/like manner even to the DOE that irradiates (outputs) the plurality of light beams 702, 704, and 706 in parallel. For example, for the DOE that irradiates (outputs) the plurality of lights 702, 704, and 706 in parallel, the distance between the plurality of light spots irradiated on the subject can be shortened as the distance between the light emitting element and the DOE increases, whereas the distance between the plurality of light spots increases as the distance between the light emitting element and the DOE decreases.

In addition, the mobile terminal 100 related to the present invention includes the lighting device 200 that is capable of varying the light pattern. In addition, the mobile terminal 100 includes a camera 121 and a controller 180 for controlling the camera and the lighting device.

Hereinafter, description will be given in more detail of a method in which a mobile terminal controls a lighting device to vary a light pattern. In particular, FIG. 9 is a conceptual view illustrating a method in which a mobile terminal controls a lighting device to vary a light pattern in accordance with one embodiment of the present invention.

When capturing an image through the camera 121, the controller 180 can drive the driving unit of the lighting device in a preset manner. The controller 180 can extract depth information related to the image received through the camera 121 using a first light pattern and a second light pattern irradiated on a subject, so that a resolution of the depth information of the image can be high.

Figure 9:
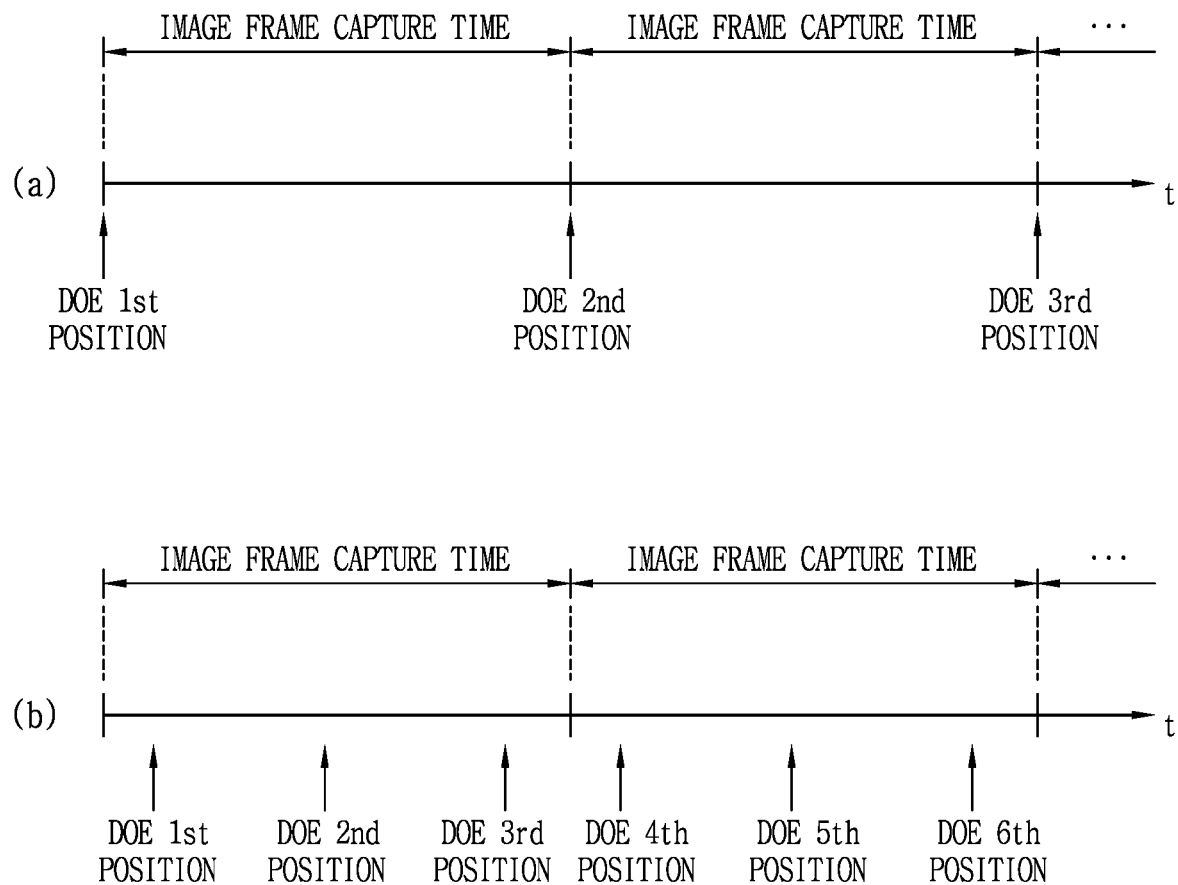
FIG. 9 is a conceptual view illustrating a method in which a mobile terminal controls a lighting device to vary a light pattern in accordance with one embodiment of the present invention.

For example, as illustrated in (a) of FIG. 9, the controller 180 can control the driving unit 600 of the lighting device such that the DOE 220 of the lighting device 200 moves once every time one image frame (one still image in case of a still image, or one frame in case of a video) is captured through the camera 121. For example, when capturing a first image frame, the controller 180 can control the driving unit 600 such that the DOE is disposed at a first position.

The controller 180 can then control the driving unit 600 to arrange the DOE at a second position different from the first position when capturing a second image frame after capturing the first image frame. In addition, the DOE can be moved from the first position to the second position by the operation of the driving unit 600. Accordingly, a light pattern formed by a plurality of light spots irradiated on the subject when the first image frame is captured is different from that when the second image frame is captured.

Further, as illustrated in (b) of FIG. 9, the controller 180 can control the driving unit of the lighting device such that the DOE 220 of the lighting device 200 moves plural times while capturing one image frame through the camera 121. For example, as illustrated in (b) of FIG. 9, the controller 180 can control the driving unit 600 so that the DOE is located at different positions a plurality of times while capturing the first image frame.

Accordingly, during the capturing of the first image frame, the light pattern formed by the plurality of light beams (or light spots) irradiated on the subject can be varied by the plurality of times. For example, the controller 180 can change the light pattern irradiated on the subject plural times while one image is captured, so that resolution of depth information related to the image received through the camera 121 can be high. For example, while capturing one image through the camera 121, the controller 180 can control the driving unit so that the distance between the light emitting element and the DOE is a first distance, and then irradiate a first light pattern to the subject accordingly.

The controller 180 can control the driving unit so that the distance between the light emitting element and the DOE is changed to a second distance different from the first distance while the one image is captured, and then irradiate a second light pattern different from the first light pattern to the subject. The first light pattern and the second light pattern can be irradiated on different positions of the subject.

Accordingly, the present invention can irradiate the first light pattern and the second light pattern different from each other to the subject while capturing one image, thereby increasing resolution when extracting the depth information related to the image. Thereafter, the controller 180 can control the driving unit 600 such that the DOE is located at different positions a plurality of times while capturing a second image frame after capturing the first image frame. According to the method illustrated in (b) of FIG. 9, depth information can be extracted at high resolution by varying a plurality of times a light pattern formed by light spots irradiated on the subject when a single image frame is captured.

In the present invention, since the image frame refers to one still image or one frame of a moving image (or video), the method illustrated in (b) of FIG. 9 can be applied when capturing a still image, and the method illustrated in (a) of FIG. 9 can be applied when capturing a moving image. However, it should be noted that the present invention is not limited thereto.

With this configuration, the present invention can provide a novel mobile terminal capable of extracting depth information related to an image (including still image and moving image) in an optimized manner according to a situation by varying a light pattern in various ways when capturing the image. A mobile terminal of the present invention can provide a high-resolution pattern lighting module (high-resolution lighting device) capable of varying a distance between a plurality of light spots (i.e., capable of changing a light pattern). In this way, high resolution of a camera can be implemented and resolution for extracting depth information can be high.

By using the lighting device of the present invention, a depth image that has stayed at the related art VGA level can be captured up to a depth image of HD or higher. A plurality of light emitting elements included in the related art lighting device has a spaced distance between a plurality of light emitting elements for connection of circuits, and thereby a problem that a spaced distance is also fixedly generated between light spots irradiated on a subject has been caused. This may cause a problem of resolution.

However, the present invention can change a distance between light spots by moving a DOE in one direction (for example, an up-down direction or an optical-axis direction), and therefore, a spaced distance fixedly generated between the light spots can be eliminated. As described above, the present invention provides a novel lighting device capable of varying a light pattern irradiated on a subject. In addition, the present invention provides a novel mobile terminal capable of varying resolution for extracting depth information from an image by controlling a light pattern, which is used for extracting depth information, in various ways when capturing the image.

The present invention can be implemented as computer-readable codes in a program-recorded medium. The computer-readable medium may include all types of recording devices each storing data readable by a computer system. Examples of such computer-readable media may include hard disk drive (HDD), solid state disk (SSD), silicon disk drive (SDD), ROM, RAM, CD-ROM, magnetic tape, floppy disk, optical data storage element and the like. Also, the computer-readable medium may also be implemented as a format of carrier wave (e.g., transmission via an Internet). The computer may include the controller 180 of the terminal. Therefore, it should also be understood that the above-described embodiments are not limited by any of the details of the foregoing description, unless otherwise specified, but rather should be construed broadly within its scope as defined in the appended claims, Therefore, all changes and modifications that fall within the metes and bounds of the claims, or equivalents of such metes and bounds are therefore intended to be embraced by the appended claims.

What is claimed is:

1. A mobile terminal, comprising:
a camera;
a lighting device; and
a controller to control the camera and the lighting device,
wherein the lighting device comprises:
a printed circuit board;
a light emitting element provided on the printed circuit board to emit light of a specific pattern;
a diffractive optical element to diffract a part of light emitted from the light emitting element;
a lens through which light diffracted by the diffractive optical element is incident on a subject; and
a driving unit to:
move the diffractive optical element a first distance from the light emitting element such that the light incident through the lens is irradiated as a first light pattern to the subject, and
move the diffractive optical element a second distance from the light emitting element such that the light incident through the lens is irradiated as a second light pattern to the subject,
wherein the controller extracts depth information related to an image received through the camera using the first light pattern and the second light pattern irradiated on the subject,
wherein the light incident through the lens is irradiated on a first position of the subject when the diffractive optical element is the first distance from the light emitting element,
wherein the light incident through the lens is irradiated on a second position of the subject when the diffractive optical element is the second distance from the light emitting element different from the first distance, and
wherein the first position of the subject is a position different from the second position of the subject.

2. The terminal of claim 1, wherein the first light pattern and the second light pattern are different from each other.

3. The terminal of claim 1, wherein the diffractive optical element splits one light output from the light emitting element into a plurality of light beams, and
wherein the plurality of light beams are irradiated on the subject spaced a predetermined distance from the light emitting element.

4. The terminal of claim 3, wherein the diffractive optical element outputs the plurality of split light beams to the lens.

5. The terminal of claim 3, wherein the diffractive optical element irradiates the plurality of split light beams in parallel.

6. The terminal of claim 1, wherein the controller drives the driving unit of the lighting device in a preset manner when capturing the image through the camera.

7. The terminal of claim 6, wherein the controller controls the driving unit of the lighting device so that the diffractive optical element of the lighting device is moved once every time one image frame is captured through the camera.

8. The terminal of claim 6, wherein the controller controls the driving unit of the lighting device so that the diffractive optical element of the lighting device is moved a plurality of times while capturing one image frame through the camera.

9. A mobile terminal, comprising:
a camera;
a lighting device; and
a controller to control the camera and the lighting device,
wherein the lighting device comprises:
a printed circuit board;
a light emitting element provided on the printed circuit board to emit light of a specific pattern;
a diffractive optical element to diffract a part of light emitted from the light emitting element;
a lens through which light diffracted by the diffractive optical element is incident on a subject; and
a driving unit to:
move the diffractive optical element a first distance from the light emitting element such that the light incident through the lens is irradiated as a first light pattern to the subject, and
move the diffractive optical element a second distance from the light emitting element such that the light incident through the lens is irradiated as a second light pattern to the subject,
wherein the controller extracts depth information related to an image received through the camera using the first light pattern and the second light pattern irradiated on the subject,
wherein the diffractive optical element splits one light output from the light emitting element into a plurality of light beams,
wherein the plurality of light beams are irradiated on the subject spaced a predetermined distance from the light emitting element, and
wherein a distance between a plurality of light spots corresponding to the plurality of light beams irradiated on the subject is varied depending on a distance between the light emitting element and the diffractive optical element.

10. The terminal of claim 9, wherein the distance between the plurality of light beams irradiated on the subject is shortened as the distance between the light emitting element and the diffractive optical element increases, and
wherein the distance between the plurality of light beams irradiated on the subject is increased when the distance between the light emitting element and the diffractive optical element is reduced.

11. The terminal of claim 9, wherein the distance between the plurality of light beams has a first spaced distance when the distance between the light emitting element and the diffractive optical element is the first distance, and
wherein the distance between the plurality of lights has a second spaced distance longer than the first spaced distance when the distance between the light emitting element and the diffractive optical element is the second distance shorter than the first distance.

12. The terminal of claim 9, wherein the plurality of lights irradiated on the subject form a light pattern, and
wherein the light pattern is changed based on a change in the distance between the light emitting element and the diffractive optical element.

13. The terminal of claim 12, wherein the plurality of light beams is irradiated on the subject to have the first light pattern when the distance between the light emitting element and the diffractive optical element is the first distance, and
wherein the plurality of light beams is irradiated on the subject to have the second light pattern different from the first light pattern when the distance between the light emitting element and the diffractive optical element is the second distance different from the first distance.

* * * * *